US008867079B2

(12) United States Patent
    Kishimoto

(10) Patent No.: US 8,867,079 B2
(45) Date of Patent: Oct. 21, 2014

(54) METHOD AND APPARATUS FOR COMMUNICATING USER INFORMATION USING BODY AREA NETWORK

(71) Applicant: Kazuhisa Kishimoto, Mitaka (JP)

(72) Inventor: Kazuhisa Kishimoto, Mitaka (JP)

(73) Assignee: Konica Minolta Business Technologies, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 13/753,304

(22) Filed: Jan. 29, 2013

(65) Prior Publication Data

US 2013/0194632 A1      Aug. 1, 2013

(30) Foreign Application Priority Data

Jan. 30, 2012   (JP) ................................ 2012-017225

(51) Int. Cl.
    *G06F 3/12*       (2006.01)
    *H04N 1/00*       (2006.01)

(52) U.S. Cl.
    CPC .............. *G06F 3/12* (2013.01); *H04N 1/00408* (2013.01)
    USPC ......... 358/1.15; 340/635; 358/1.13; 455/41.1

(58) Field of Classification Search
    None
    See application file for complete search history.

(56) References Cited

U.S. PATENT DOCUMENTS

| 5,796,827 A * | 8/1998 | Coppersmith et al. ........ 713/182 |
| 2004/0041834 A1* | 3/2004 | Wegeng et al. ................ 345/740 |
| 2005/0195231 A1* | 9/2005 | Kasamatsu ..................... 347/14 |
| 2006/0239421 A1* | 10/2006 | Ishibashi et al. ............. 379/88.13 |
| 2009/0127328 A1* | 5/2009 | Aissa ............................. 235/377 |
| 2009/0140064 A1* | 6/2009 | Schultz et al. ................... 236/51 |
| 2009/0316186 A1* | 12/2009 | Higashi et al. ................ 358/1.15 |
| 2010/0079300 A1* | 4/2010 | Agata ............................ 340/635 |
| 2010/0149399 A1* | 6/2010 | Mukai et al. ............. 348/333.02 |
| 2010/0277763 A1* | 11/2010 | Aoyama et al. ............... 358/1.15 |
| 2011/0178499 A1* | 7/2011 | Brukalo et al. ................ 604/504 |
| 2011/0310010 A1* | 12/2011 | Hoffnung et al. ............. 345/157 |

FOREIGN PATENT DOCUMENTS

| JP | 2010-002999 A | 1/2010 |
| JP | 2010-164663 A | 7/2010 |
| JP | 2010-262454 A | 11/2010 |
| JP | 2011-259171 A | 12/2011 |

OTHER PUBLICATIONS

Office Action (Notification of Reasons for Refusal) issued on Mar. 4, 2014, by the Japan Patent Office in corresponding Japanese Patent Application No. 2012-017225, and an English Translation of the Office Action. (6 pages).

\* cited by examiner

*Primary Examiner* — David S Cammack
(74) *Attorney, Agent, or Firm* — Buchanan Ingersoll & Rooney P.C.

(57) ABSTRACT

There is provided an information processing apparatus including: a body area network communication part that performs communication with a terminal apparatus carried by a user, using a user's human body as a communication channel; a display and operating part having a display part that displays a screen and having, on the display part, an electrode for body area network communication, the screen receiving an operation performed by the user; and a control part that displays on the display part an operation key for allowing information stored in the terminal apparatus to be obtained by the body area network communication, when it is determined at the time of the user touching the electrode that communication between the body area network communication part and the terminal apparatus can be performed.

29 Claims, 18 Drawing Sheets

METHOD AND APPARATUS FOR COMMUNICATING USER INFORMATION USING BODY AREA NETWORK

CROSS-REFERENCE TO RELATED APPLICATION

This application is based on Japanese Patent Application No. 2012-017225 filed on Jan. 30, 2012, the contents of which are incorporated herein by reference.

BACKGROUND

1. Technical Field

The present invention relates to an information processing apparatus, a control method therefor, and a control program. More specifically, the present invention relates to an information processing apparatus having a body area network communication function, a control method therefor, and a control program to be executed by a computer for controlling the information processing apparatus.

2. Description of Related Art

For image forming apparatuses (multifunction devices), there are techniques for performing personal authentication (user authentication) by communicating with a body area network communication terminal apparatus carried by a user, using a body area network communication function.

For example, as disclosed in Unexamined Japanese Patent Publication No. 2010-262454, there is a technique in which when a user touches an operation panel of a multifunction device using a body area network communication function, the multifunction device communicates with a terminal apparatus carried by the user using the user's human body as a communication channel, to identify and authenticate the user based on authentication data (identification data) stored in the terminal apparatus, and then, according to the authentication result, the multifunction device controls its operation in response to an operation.

In addition, for example, as with the above-described technique, as disclosed in Unexamined Japanese Patent Publication No. 2010-2999, there is a technique in which communication is performed with a terminal apparatus carried by a user using a body area network communication function, to perform authentication using authentication data stored in the terminal apparatus, and then, it is further determined whether use of an identified function among functions indicated by received user information is allowed, and display according to the determination result is performed on a touch panel.

Furthermore, for example, as disclosed in Unexamined Japanese Patent Publication No. 2010-164663, there is a technique in which authentication is performed by the combination of fingerprint authentication and a body area network communication function, using the fingerprint of a finger with which a user touches an operation panel of a multifunction device, and communication is performed with a terminal apparatus carried by the user using the user's human body as a communication channel, to perform control based on information stored in the terminal apparatus.

In all of these techniques, authentication data stored in a terminal apparatus carried by a user is taken out using body area network communication, and authentication is performed. If the user is authenticated, then an automatic operation (operation of a multifunction device) is performed according to user information and information stored in the terminal apparatus.

As automation using body area network communication advances like the above-described conventional techniques, there arise cases in which user convenience is not always improved.

For example, even if a user carries a terminal apparatus having a body area network communication function, there may be a case in which the user does not want automatic operation based on information stored in the terminal apparatus currently carried by him/her to be performed.

In such a case, in the conventional techniques, there is a need to set a multifunction device such that it does not perform authentication itself from the start and then start an operation, or to perform an operation to forcefully stop operation that is automatically started. This ends up involving extra work. Meanwhile, there still remains a demand of a user carrying a terminal apparatus for automatic predetermined operation with minimum work.

SUMMARY

Objects of the present invention are therefore to provide an information processing apparatus capable of performing functions and operation according to moment-to-moment needs by a holder (user) of a terminal apparatus using body area network communication with minimum work, a control method therefor, and a control program.

To achieve at least one of the abovementioned objects, an information processing apparatus reflecting one aspect of the present invention comprises: a body area network communication part that performs communication with a terminal apparatus carried by a user, using a user's human body as a communication channel; a display and operating part having a display part that displays a screen and having, on said display part, an electrode for body area network communication, said screen receiving an operation performed by said user; and a control part that displays on said display part an operation key for allowing information stored in said terminal apparatus to be obtained by said body area network communication, when it is determined at time of said user touching said electrode that communication between said body area network communication part and said terminal apparatus can be performed.

It is preferred for the above described information processing apparatus that said control part obtains information stored in said terminal apparatus through said body area network communication part after an input is made to said operation key displayed on said display and operating part.

It is preferred for the above described information processing apparatus that said operation key is at least any one of a key for obtaining destination information stored in said terminal apparatus, a key for obtaining personal setting information stored in said terminal apparatus, a key for obtaining user authentication information stored in said terminal apparatus, and a key for obtaining security document information stored in said terminal apparatus.

It is preferred for the above described information processing apparatus as that said control part displays said operation key for a predetermined period of time after determining that communication between said body area network communication part and said terminal apparatus can be performed.

It is preferred for the above described information processing apparatus that in a case in which it is determined that communication between said body area network communication part and said terminal apparatus cannot be performed, when said operation key is displayed, said control part deletes said operation key being displayed.

The objects, features, and characteristics of this invention other than those set forth above will become apparent from the description given herein below with reference to a preferred embodiment illustrated in the accompanying drawings.

DETAILED DESCRIPTION

An embodiment of the present invention will be described below with reference to the drawings.

Figure 1:
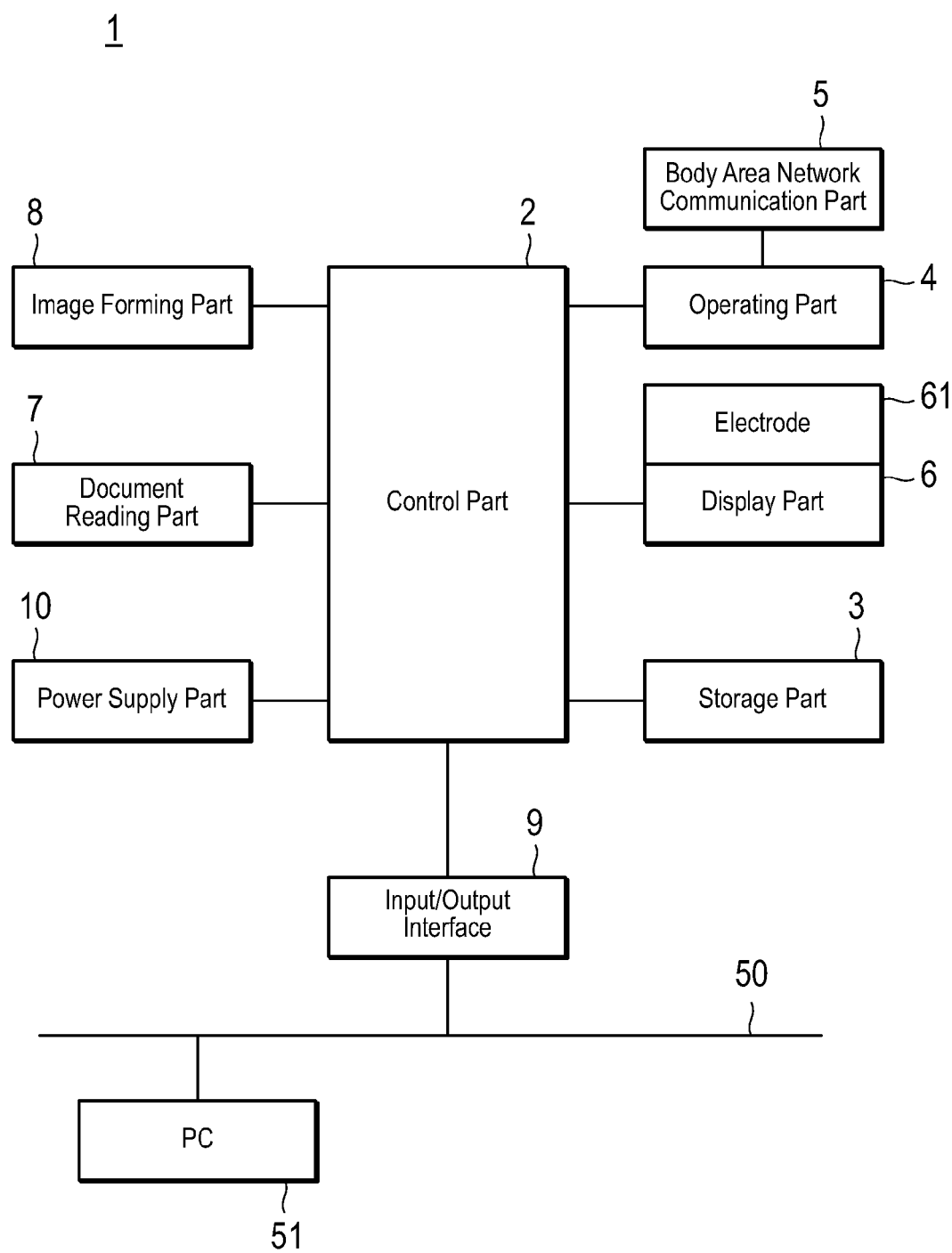
FIG. 1 is a block diagram for describing a configuration of an image forming apparatus serving as an information processing apparatus which is one embodiment of the present invention.

FIG. 1 is a block diagram for describing a configuration of an image forming apparatus serving as an information processing apparatus which is one embodiment of the present invention.

An image forming apparatus 1 includes a control part 2, a storage part 3, an operating part 4, a body area network communication part 5, a display part 6, a document reading part 7, an image forming part 8, an input/output interface 9, and a power supply part 10.

The control part 2 performs overall control of the image forming apparatus 1. Here, particularly, control of communication using body area network communication is also performed by the control part 2. The control part 2 includes a CPU (central processing unit). The CPU together with the storage part 3 (a ROM (read-only memory), a RAM (random-access memory), and an HDD (hard disk drive) (none of which are shown)) executes a control program for performing steps which will be described later, as a so-called computer. By the control part 2 executing the control program, control of all and each part of the image forming apparatus 1 is performed. Control using body area network communication is also performed by the control part 2 executing a control program for performing steps which will be described later.

The storage part 3 includes the ROM, the RAM, the HDD (none of which are shown), etc. The ROM is a nonvolatile unwritable memory and performs permanent data storage. The ROM stores, for example, a program for basic operation which controls the startup of the image forming apparatus 1.

The RAM is a volatile memory. The RAM serves as a work area used by the CPU, and performs temporary data storage. In addition, the RAM temporarily stores read images, received images, etc., until an instruction to save the images is finally provided. The RAM also temporarily stores information for determination which is shared between control flows, etc.

The HDD is a nonvolatile writable memory and performs permanent data storage involving changes. The HDD stores a program for overall control of the image forming apparatus 1, a program for control using body area network communication, etc.

The operating part 4 accepts user operation inputs on the image forming apparatus 1 (calling of various functions and operation, inputting of settings, etc.). The operating part 4 includes a touch panel placed on the display part 6 and hard keys, e.g., a numeric keypad, a start key, and a cancel key, and accepts inputs from the touch panel and the hard keys. A user inputs a desired operation condition from the operating part 4 or inputs a startup instruction. In addition, an instruction to change the display content, etc., is also inputted from the operating part 4.

The operating part 4 further includes an electrode 61 for body area network communication, which is disposed on the display part 6. The operating part 4 includes the body area network communication part 5 that performs communication with a terminal apparatus carried by the user. By the user touching the electrode 61 on the display part 6, the body area network communication part 5 performs communication using the human body as a communication channel.

The body area network communication part 5 includes a communication circuit for performing communication with the terminal apparatus carried by the user, using the human body as a communication channel.

The display part 6 is configured by a display panel having graphical display capability (e.g., a liquid crystal display panel). On the display panel is disposed the above-described touch panel. On the display part 6, apparatus information, operation buttons for various operation condition settings regarding use, etc., are displayed to the user. Note that in this specification, the operating part 4 and the display part 6 may be collectively referred to as a display and operating part.

The document reading part 7 reads an original document for an image to be formed and converts the read document into electronic data. The electronic data (digital data) is stored on the HDD or is transferred to a computer, etc., connected through a network. Alternatively, as a so-called copy function, the image data is transferred to and printed by the image forming part 8.

The image forming part 8 forms (prints) an image created based on the image data, on paper using a developer such as a toner.

The input/output interface 9 connects the image forming apparatus 1 to a network 50. For this, the input/output interface 9 performs transmission and reception of data, according to the standard of the network 50 to be connected. Here, the network 50 is various types of network 50 such as a LAN (Local Area Network) where computers and network devices are connected to one another using standards, e.g., Ethernet (registered trademark), token ring, and FDDI (Fiber Distributed Data Interface), and a WAN (Wide Area Network) where LANs are connected to one another by dedicated lines.

A computer (PC (personal computer) in the drawing) 51 that creates print jobs is connected to the network 50. Note that although the drawing illustrates that one image forming apparatus 1 and one computer 51 are connected to the network 50, a plurality of image forming apparatuses 1 and a plurality of computers 51 may be connected to the network 50.

The image forming apparatus 1 receives a print job from the computer 51 through the input/output interface 9, and performs printing by the image forming part 8.

The power supply part 10 supplies power received from a power supply source in a location where the image forming apparatus 1 is placed, to each component in the apparatus 1.

Figure 2:
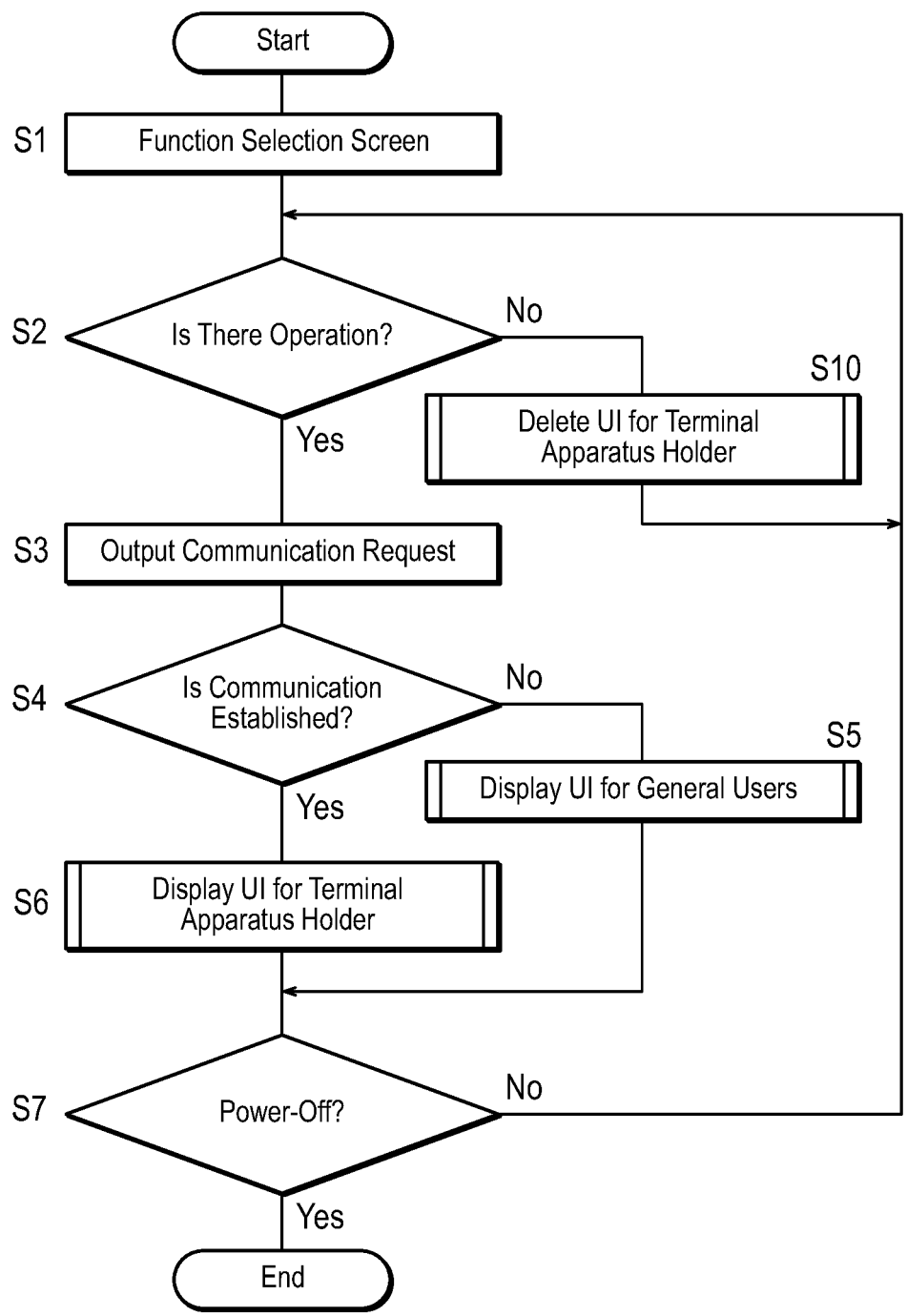
FIG. 2 is a flowchart illustrating the steps for the print instruction accept operation of the image forming apparatus.

Next, the operation of the image forming apparatus 1 will be described. FIG. 2 is a flowchart (main routine) illustrating the steps for the print instruction accept operation of the image forming apparatus 1.

First, by power-on, the control part 2 displays, as an initial screen, a function selection screen (details will be described later) on the display part 6 (S1). The functions include, for example, a scanner function that reads a document by the document reading part 7 and transmits a read image to a predetermined address (an email address, an address of a client computer, etc.); a copy function that reads a document by the document reading part 7 and prints a read image by the image forming part 8; a FAX function that reads a document by the document reading part 7 and transmits a read image to an external source by facsimile; a box function where data to be printed is stored; and a login selection function for performing the function settings of the image forming apparatus 1 itself.

It is determined whether a user (operator) has performed an operation from this state by touching the electrode 61 disposed on the display part 6 (S2). That is, this determines whether the user has touched (pressed) the operation panel (touch panel) to select a function from the function selection screen. The apparatus remains in a standby state until the user touches the operation panel (S2: NO). At this time, by a lapse of a predetermined period of time, etc., the display provided on the operation panel may be changed from one for body area network communication to one for general users (not performing body area network communication) (S10 (details will be described later)).

If the control part 2 recognizes that the user has touched the operation panel (S2: YES), then the control part 2 holds a selected function (stores it in the storage part 3) and outputs a communication request to a terminal apparatus through the body area network communication part 5 (S3). The output flows to the terminal apparatus carried by the user, through the human body from the electrode 61 on the display part 6.

Then, the control part 2 checks whether there is a reply to the communication request from the terminal apparatus (S4). If there is no reply (S4: NO), then communication with the terminal apparatus is not established, which indicates that the user performing an operation is not carrying a terminal apparatus for body area network communication. Therefore, in this case, a user interface for general users (user interface (UI) for not performing body area network communication) is displayed on the display part 6 (S5). Thereafter, general operation is performed (this is the operation of a general image forming apparatus (a copier, a printer, etc.) and thus description thereof is omitted).

On the other hand, at S4, if there is a reply, then communication with the terminal apparatus carried by the user is established (S4: YES). That is, this state indicates that the user performing an operation has a terminal apparatus for body area network communication and moreover the terminal apparatus is capable of performing communication with the image forming apparatus 1, i.e., communication has been established with the terminal apparatus. Note, however, that at this stage at S4, only the fact that communication can be performed is found, and reading of information (e.g., information such as a user ID, a password, and various settings) in the terminal apparatus carried by the user is not performed.

If communication with the terminal apparatus carried by the user has been established, then the control part 2 moves to the process of displaying a user interface for a terminal apparatus holder (S6). Thereafter, the process starting from S1 continues until power-off (S7).

Figure 3:
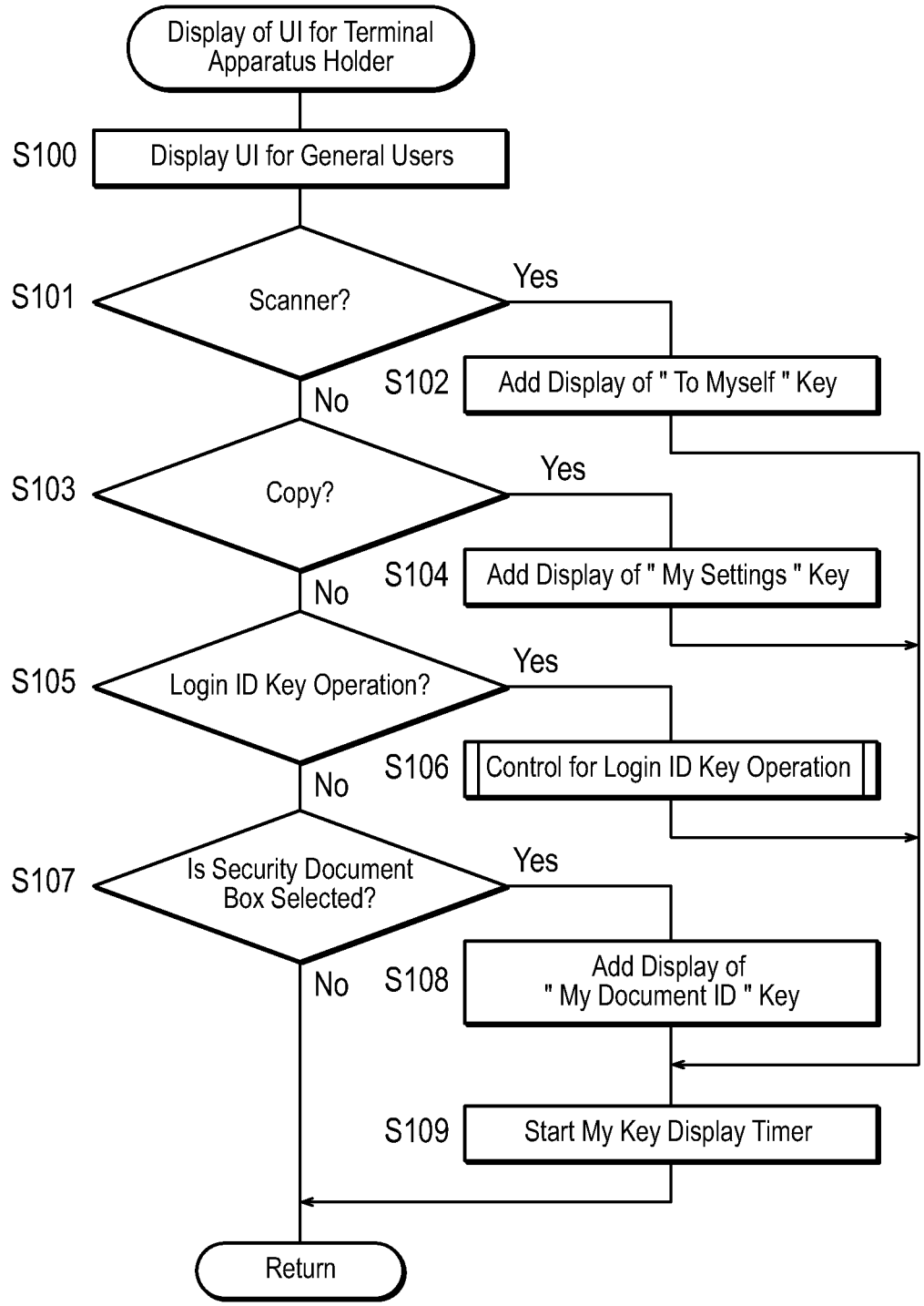
FIG. 3 is a subroutine flowchart illustrating the steps for the process of displaying a user interface for a terminal apparatus holder.

FIG. 3 is a subroutine flowchart illustrating the steps for the process of displaying a user interface for a terminal apparatus holder.

When going into the above-described step S6, first, according to the function selected from the initial screen (function selection screen) (the key input held when the function is selected at S2), a user interface screen for general users for the selected function is displayed (S100). This screen is a common screen to the case of general users and the case of using body area network communication in the selected function. Thus, in the subroutine, the process of displaying a user interface screen for general users is performed first.

Thereafter, display using body area network communication is performed step by step, according to the function selected on the initial screen (function selection screen: S1).

If the scanner function is selected (S101: YES), then an operation key for selecting, as a scan destination, "to myself" ("myself" indicates the user performing an operation; the same applies to the following) is additionally displayed on the screen displayed at S100 (S102). Such an added operation key is an operation key for allowing information stored in the terminal apparatus to be obtained, using the body area network communication function (the same applies to the following). Note that in the procedure the user interface screen for general users at S100 is displayed and then the operation key at S102 is displayed in turn, but the actual display looks as if the screen at S100 and the additionally displayed operation key are displayed at the same time (for the following other functions, too, likewise, an operation key is displayed added to the user interface screen for general users).

When "to myself" is selected, the control part 2 requests, through the body area network communication part 5, the terminal apparatus carried by the user to provide his/her address. By the request, the control part 2 obtains his/her address from the terminal apparatus. Then, the control part 2 designates the obtained his/her address as a scanned data destination.

If the copy function is selected on the initial screen (function selection screen) (S103: YES), then an operation key for selecting settings set for him/herself (my settings) as settings such as the size of paper for output upon copying, the number of copies, and color/black and white is additionally displayed (S104). Here, when "my settings" is selected, the control part 2 requests, through the body area network communication part 5, the terminal apparatus carried by the user to provide his/her settings. Then, the control part 2 performs settings to perform copy output by his/her settings obtained by the request. In the copy function, too, it is also possible that copy settings associated with his/her ID are stored in advance in the image forming apparatus 1, and only an ID is obtained from the terminal apparatus, and then copying is performed using the settings associated with the obtained ID.

If the login ID key operation is selected on the initial screen (function selection screen) (S105: YES), then an operation key for moving to login ID key operation control is additionally displayed (S106).

If the security document box is selected on the initial screen (function selection screen) (S107: YES), then an operation key for selecting "my document ID" as a document box number for a printed matter to be taken out is additionally displayed (S108). Here, when "my document ID" is selected, the control part 2 requests, through the body area network communication part 5, the terminal apparatus carried by the user to provide his/her ID. Then, the control part 2 outputs (prints) a document stored in a document box associated with his/her ID obtained by the request. Note that the security document box is the function of not performing printing during a period from when a print job is received from the computer 51 until the user directly inputs to the image forming apparatus 1 an ID that instructs to start printing. Here, by obtaining an ID through body area network communication, the user having touched the image forming apparatus 1 is recognized as a user who takes out a document from the document box, and the document is outputted.

After displaying my key (S102, S104, S106, or S108), counting of selection waiting time for each function (my key display timer) starts (S109). Thereafter, if there is no operation, then at the process at S100 the display changes to one for a user interface for general users.

Figure 4:
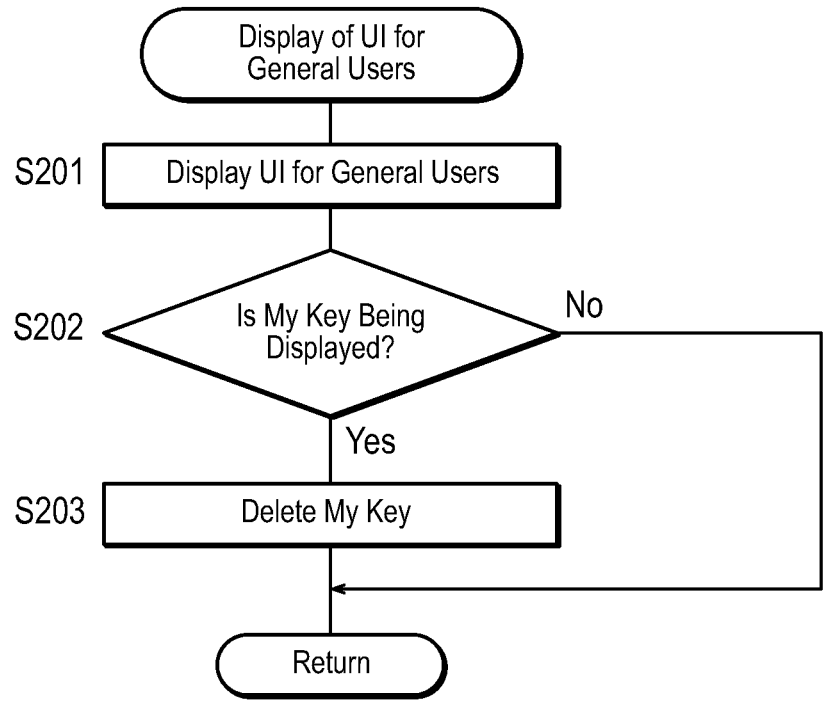
FIG. 4 is a subroutine flowchart illustrating the steps for display of a user interface for general users.

FIG. 4 is a subroutine flowchart illustrating the steps for display of a user interface for general users. This procedure indicates the process at S5.

A user interface for general users for the function selected on the initial screen (function selection screen) is displayed (S201). Thereafter, it is determined whether my key (display at S102, S104, S106, or S108) is being displayed (or whether there is an instruction to do so) (S202). If my key is being displayed, then the display is deleted (S203) and the process ends. On the other hand, if my key is not being displayed, then the display of the user interface for general users for the function selected on the initial screen (function selection screen) continues as it is.

Figure 5:
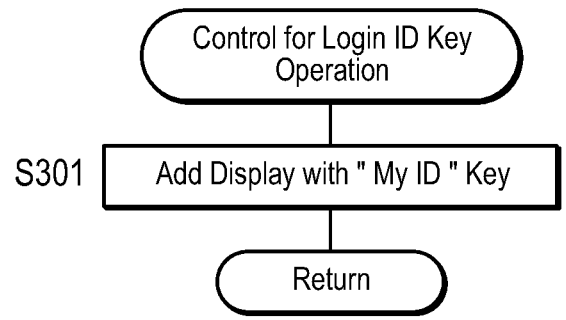
FIG. 5 is a subroutine flowchart illustrating one example of a step performed upon a login ID key operation.

FIG. 5 is a subroutine flowchart illustrating one example of a step performed upon a login ID key operation. This procedure indicates the process at S106.

The step illustrated in FIG. 5 is an example of displaying a "my ID" key (an operation key for allowing information stored in the terminal apparatus to be obtained). In the step, at the time of going into S106, a "my ID" key is displayed added to the user interface displayed on the display part 6 (S301). Thereafter, processing returns to the main routine. Specific exemplary display will be described later.

Figure 6:
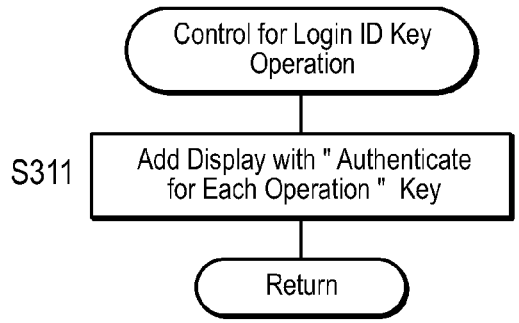
FIG. 6 is a subroutine flowchart illustrating another example of a step performed upon a login ID key operation.

FIG. 6 is a subroutine flowchart illustrating another example of a step for control performed upon a login ID key operation. This procedure also indicates the process at S106. In the step in FIG. 6, an authentication key (an operation key for allowing information stored in the terminal apparatus to be obtained) is displayed for each operation (S311). Specific exemplary display will be described later.

Figure 7:
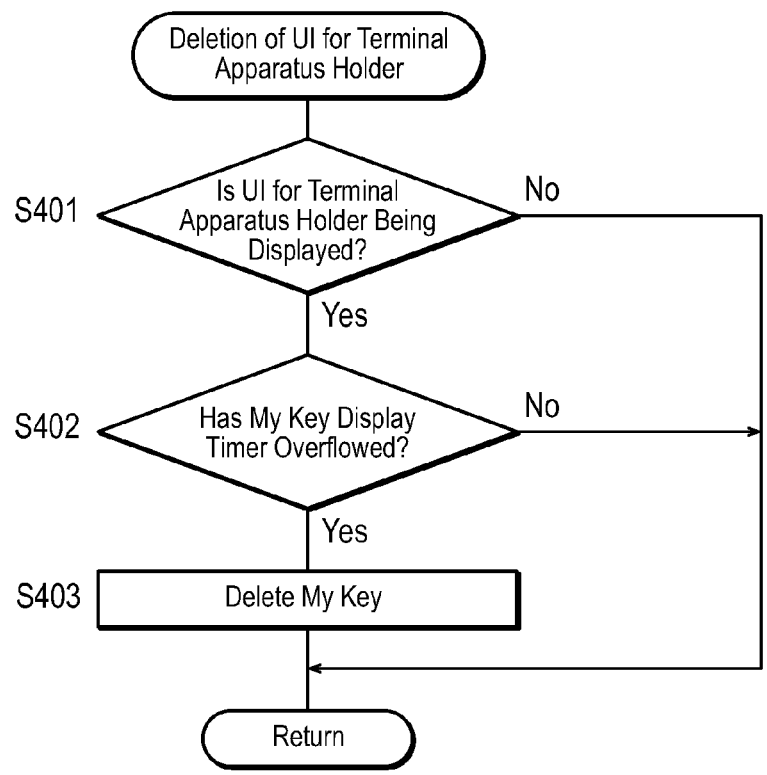
FIG. 7 is a subroutine flowchart illustrating the steps for deletion of a user interface for a terminal apparatus holder.

FIG. 7 is a subroutine flowchart illustrating the steps for deletion of a user interface for a terminal apparatus holder. This procedure indicates the process at S10.

It is determined whether a user interface for a terminal apparatus holder is being currently displayed (S401). Here, if a user interface for a terminal apparatus holder is being displayed (S401: YES), then it is further checked whether my key display timer whose counting starts at S109 has passed a predetermined period of time (overflowed) (S402). If overflowed, then my key indicating him/herself (an operation key for allowing information stored in the terminal apparatus to be obtained) is deleted (S403).

If a user interface for a terminal apparatus holder is not being displayed at S401 and if not overflowed at S402, then processing returns to the main routine.

The image forming apparatus of the present embodiment and the control steps therefor are described above.

Specific examples of a user interface displayed on the display part 6 according to the above-described control steps will be further described below.

FIGS. 8, 9, 10, and 11 are illustrative diagrams illustrating exemplary user interfaces for the case of setting a destination email address in the scanner function.

Figure 8:
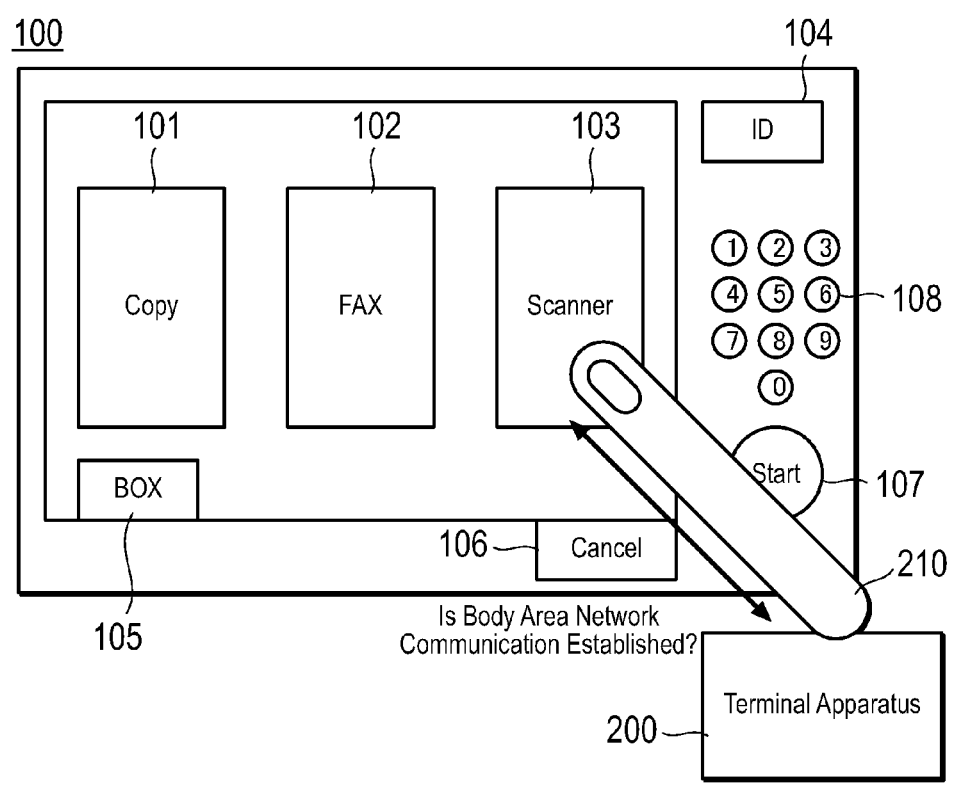
FIG. 8 is an illustrative diagram illustrating an exemplary user interface for the case of setting a destination email address in a scanner function.

As illustrated in FIG. 8, a function selection screen 100 is displayed on the display part 6 (which is the process at S1 in the above-described steps. For the S number, the same applies to the following).

Here, there are keys for selecting functions, such as a copy key 101, a FAX key 102, a scanner key 103, a BOX key 105 for opening a box where documents are stored, and an ID key 104 for login, which are displayed on the display part 6; and a cancel key 106 (which may be represented as stop, pause, etc.), a start key 107, and a numeric keypad 108 which are fixed as the operating part 4.

When a user touches the scanner key 103 displayed on the display part 6 to select the scanner function, the control part 2 checks whether body area network communication is established with a terminal apparatus 200 carried by the user through the body area network communication part 5 (S2 to S4). Note that in the drawing touching of the key by the user is schematically indicated by a finger 210 (the same applies to other drawings).

Figure 9:
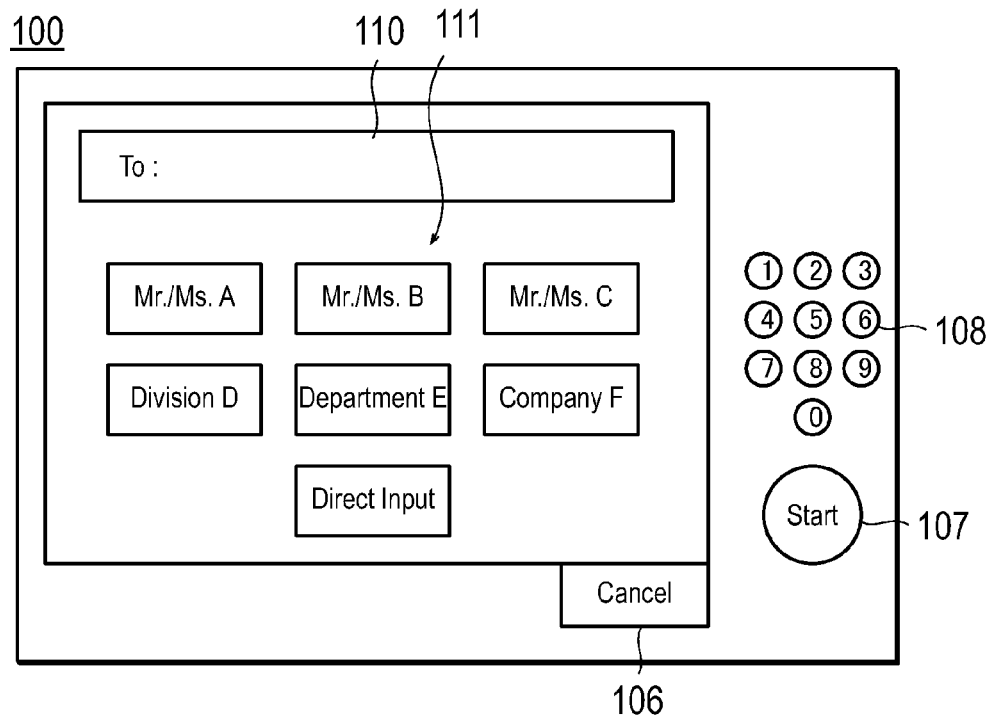
FIG. 9 is an illustrative diagram illustrating an exemplary user interface for the case of setting a destination email address in the scanner function, which continues from FIG. 8.

If the user does not carry the terminal apparatus 200, then body area network communication is not established. Thus, in that case, as shown in FIG. 9, a scanner destination setting screen is displayed (S5 and S201 to S203). The scanner destination setting screen shown in FIG. 9 displays a destination field 110 and set destination keys 111. For the user not carrying the terminal apparatus 200, when his/her email address is not registered on the image forming apparatus 1, he/she selects a direct input button (not shown) and then inputs the email address one character by one character.

On the other hand, if the user carries the body area network communication terminal apparatus 200 storing personal information (personal address, etc.), such a user is thinking that he/she wants to send image data read by the scanner function to his/her email address.

Figure 10:
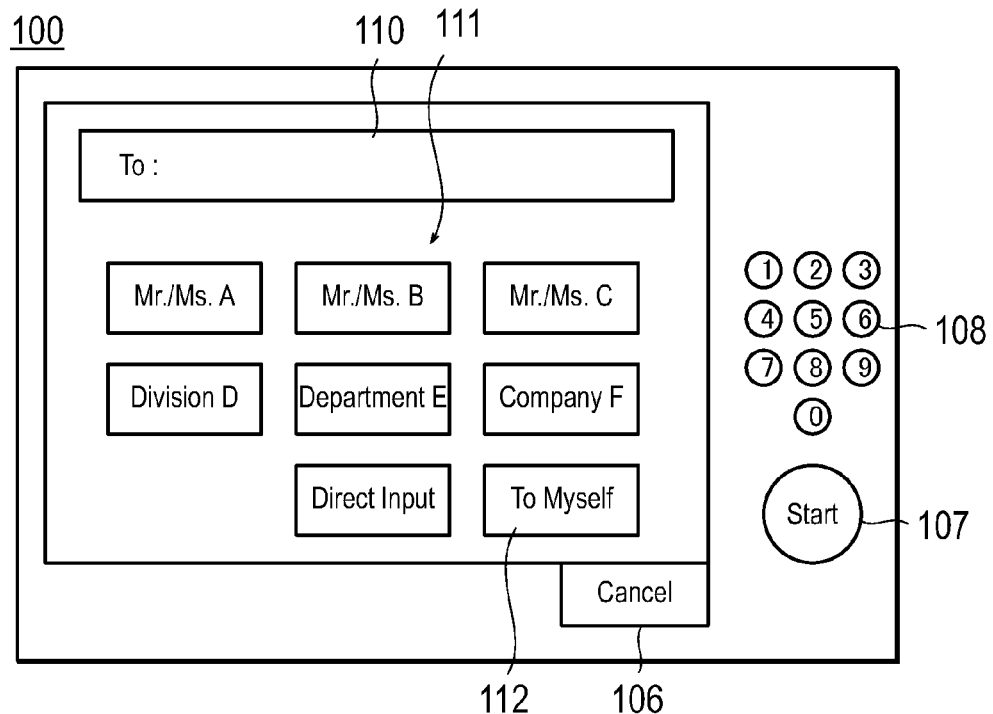
FIG. 10 is an illustrative diagram illustrating an exemplary user interface for the case of setting a destination email address in the scanner function, which continues from FIG. 9.

When the user carrying such a terminal apparatus 200 touches the scanner key 103, body area network communication is established. Thus, as shown in FIG. 10, a "to myself" key 112 for selecting his/herself as a destination is additionally displayed on a scanner destination setting screen for general users (S6, S101, and S102). The "to myself" key 112 is a key for obtaining destination information stored in the terminal apparatus 200.

Figure 11:
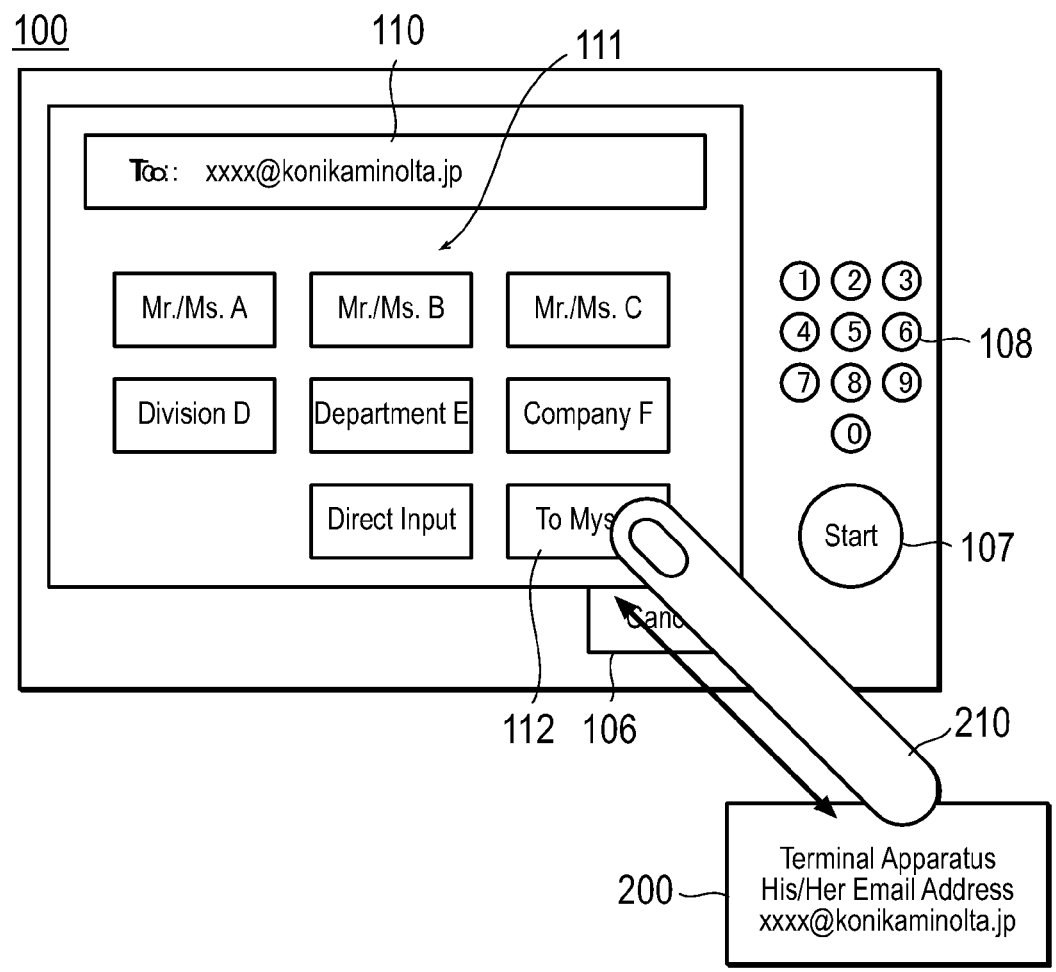
FIG. 11 is an illustrative diagram illustrating an exemplary user interface for the case of setting a destination email address in the scanner function, which continues from FIG. 10.

Then, when the user carrying the terminal apparatus 200 selects the "to myself" key 112, as shown in FIG. 11, the control part 2 performs body area network communication with the terminal apparatus 200 again to obtain his/her email address stored in the terminal apparatus 200. Then, a character string of the email address is transferred to the image forming apparatus 1 and is automatically inputted to the destination field 110. This eliminates the trouble of inputting the character string one character by one character, enabling the user to easily input his/her email address.

However, at this stage, even if the user carries the terminal apparatus 200, he/she may have a desire to send the image data to a destination other than "to myself". In such a case, if the user does not select "to myself" at this stage (e.g., the user selects other destinations or inputs the cancel key 106), then the process does not proceed any further. Therefore, if the user does not select "to myself" at this stage, then information stored in the carried terminal apparatus 200 is not taken to the side of the image forming apparatus 1. In addition, the user does not need to take the trouble to perform another operation such as turning off the body area network communication function.

As such, in the present embodiment, even if communication is established with the terminal apparatus 200, as shown in FIG. 10, the "to myself" key 112 is displayed as an operation key for allowing information stored in the terminal apparatus 200 to be obtained, which avoids a situation where information stored in the carried terminal apparatus 200 is read simultaneously with the establishment of communication. In addition, there is no need to perform another operation for preventing the information from flowing by body area network communication (e.g., an operation to terminate body area network communication).

FIGS. 12, 13, 14, and 15 are illustrative diagrams illustrating exemplary user interfaces for the case of setting conditions in the copy function.

Figure 12:
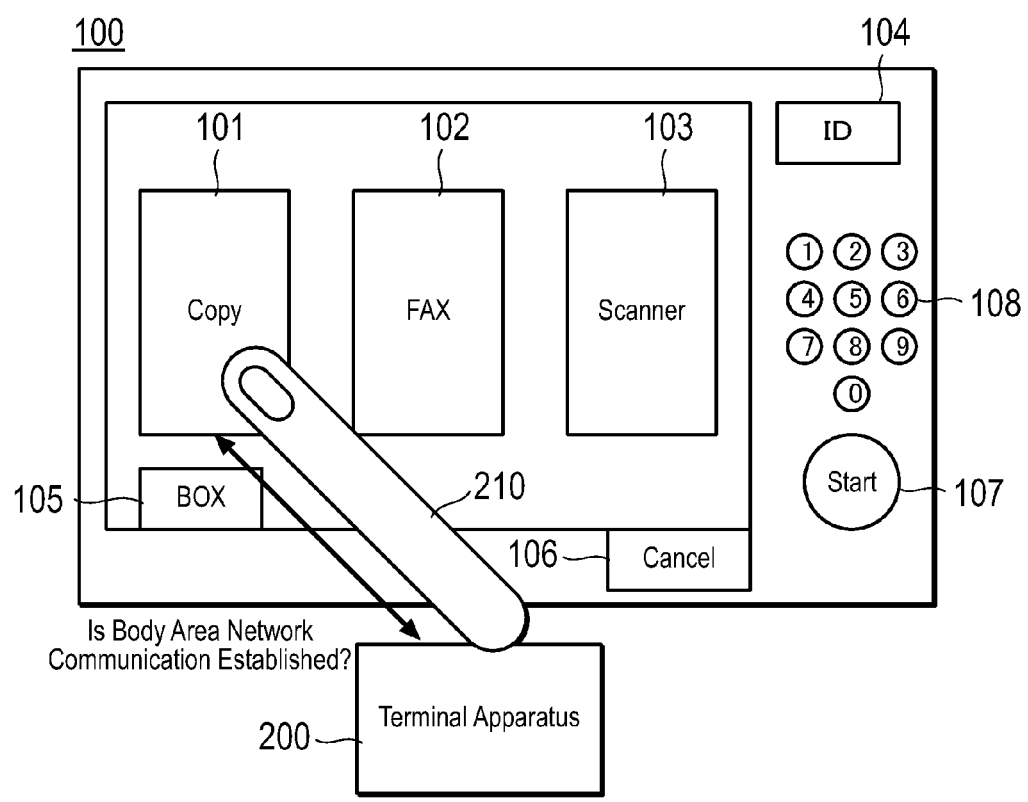
FIG. 12 is an illustrative diagram illustrating an exemplary user interface for the case of setting conditions in a copy function.

As shown in FIG. 12, first, when a user touches a copy key 101 displayed on the display part 6 to select the copy function from a function selection screen 100 which is an initial screen, the control part 2 checks whether body area network communication is established with a terminal apparatus 200 carried by the user through the body area network communication part 5 (S2 to S4).

Figure 13:
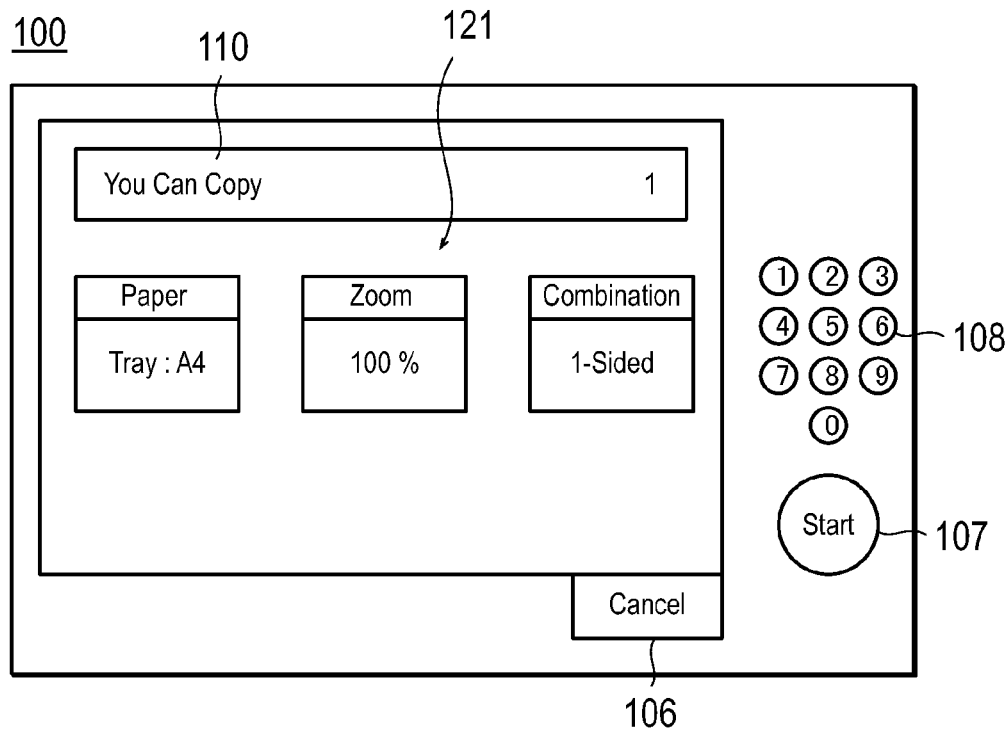
FIG. 13 is an illustrative diagram illustrating an exemplary user interface for the case of setting conditions in the copy function, which continues from FIG. 12.

If the user does not carry the terminal apparatus 200, then body area network communication is not established. Thus, in that case, as shown in FIG. 13, a copy setting screen for general users is displayed (S5 and S201 to S203). The copy setting screen for general users in FIG. 13 displays an information window 110 indicating the current state; and setting keys 121 for selecting various copy settings (setting keys for paper, zoom, combination, etc.). When the user does not carry the terminal apparatus 200, even if the user uses usual settings, he/she inputs individual setting items one by one.

On the other hand, if the user carries the terminal apparatus 200 storing personal information (e.g., personal print settings), such a user is thinking that he/she wants to perform the copy function with his/her usual settings.

Figure 14:
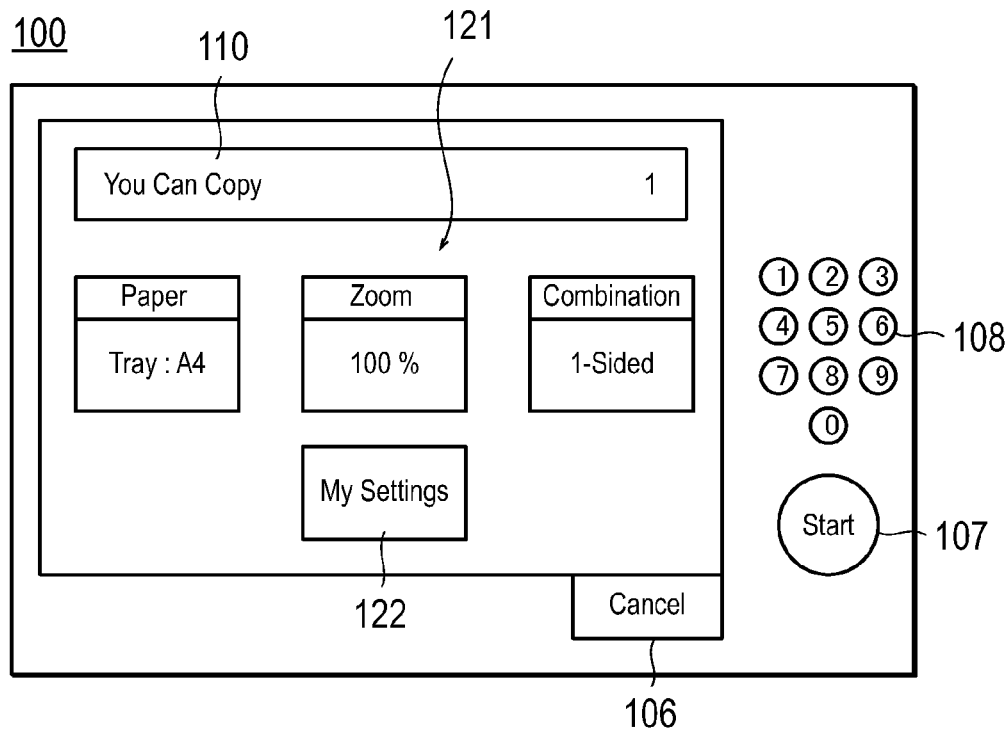
FIG. 14 is an illustrative diagram illustrating an exemplary user interface for the case of setting conditions in the copy function, which continues from FIG. 13.

When the user carrying such a terminal apparatus 200 touches the copy key 101, body area network communication is established. Thus, as shown in FIG. 14, a "my settings" key 122 for inputting his/her settings (an operation key for allowing information stored in the terminal apparatus 200 to be obtained) is simultaneously and additionally displayed on a copy setting screen for general users (S6, S103, and S104). The "my settings" key 122 is a key for obtaining personal setting information stored in the terminal apparatus 200.

Figure 15:
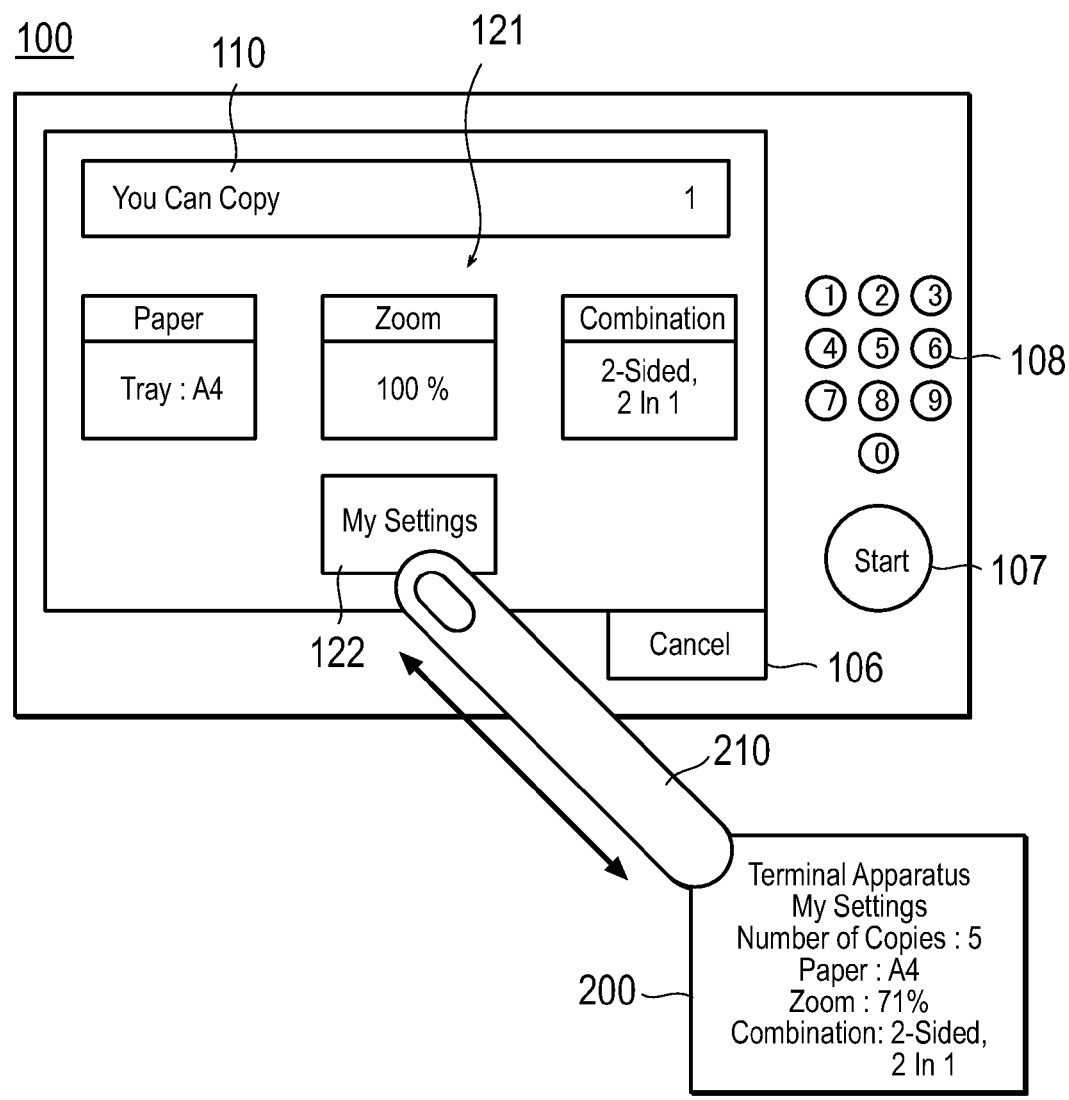
FIG. 15 is an illustrative diagram illustrating an exemplary user interface for the case of setting conditions in the copy function, which continues from FIG. 14.

When the user selects the "my settings" key 122, as shown in FIG. 15, the control part 2 performs body area network communication with the terminal apparatus 200 again to obtain his/her usual settings stored in the terminal apparatus 200. The obtained settings are inputted as copy settings on the image forming apparatus 1.

By this, the user can easily input his/her usual settings without inputting individual setting items one by one.

As such, when the copy function is selected, too, in the present embodiment, after communication is established with the terminal apparatus 200, as shown in FIG. 14, the "my settings" key 122 is displayed, which avoids a situation where information stored in the carried terminal apparatus 200 is read simultaneously with the establishment of communication. In addition, there is no need to perform another operation for preventing the information from flowing by body area network communication (e.g., an operation to terminate body area network communication).

FIGS. 16, 17, 18, and 19 are illustrative diagrams illustrating exemplary user interfaces for the case of logging into the image forming apparatus 1 by user authentication.

Figure 16:
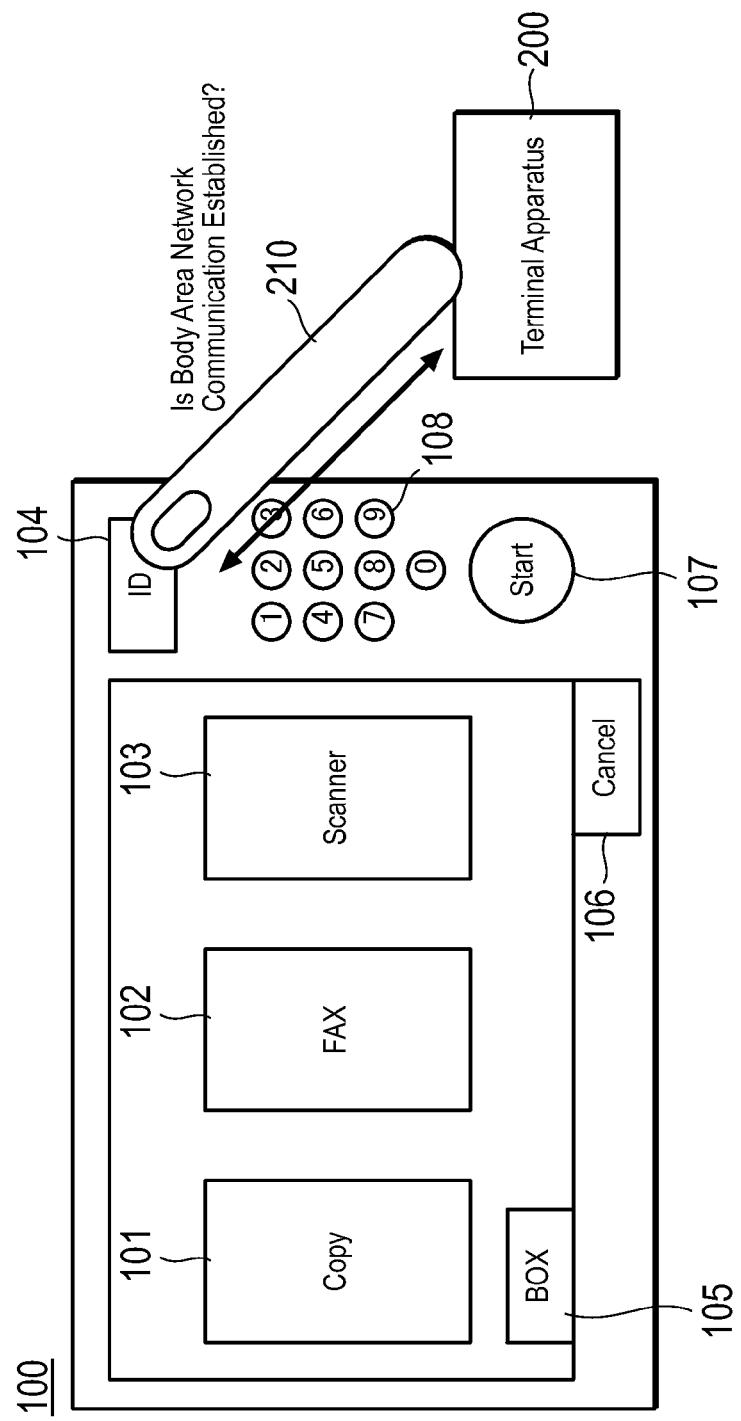
FIG. 16 is an illustrative diagram illustrating an exemplary user interface for the case of logging into the image forming apparatus by user authentication.

As illustrated in FIG. 16, first, when a user touches an ID key 104 displayed, to log into the image forming apparatus 1 from a function selection screen 100 which is an initial screen, the control part 2 checks whether body area network communication is established with a terminal apparatus 200 carried by the user through the body area network communication part 5 (S2 to S4).

Figure 17:
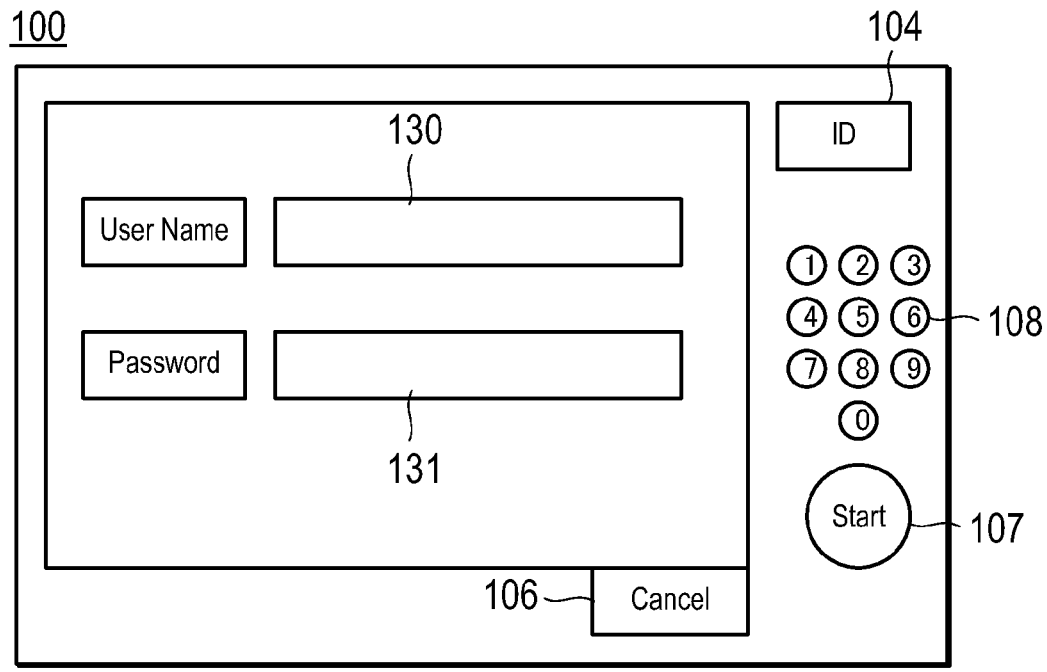
FIG. 17 is an illustrative diagram illustrating an exemplary user interface for the case of logging into the image forming apparatus by user authentication, which continues from FIG. 16.

If the user does not carry the terminal apparatus 200, then body area network communication is not established. Thus, in that case, as shown in FIG. 17, an ID input screen for general users is displayed (S5 and S201 to S203). Here, the ID input screen for general users in FIG. 17 displays a user name field 130, a password field 131, etc.

The user not carrying the terminal apparatus 200 inputs the character strings of a user name and a password one character by one character, using a character string input screen (not shown).

On the other hand, when the user carries the terminal apparatus 200 storing personal information (e.g., an ID), such a user is thinking that he/she wants to use the image forming apparatus 1 in an environment where an individual is identified by login.

Figure 18:
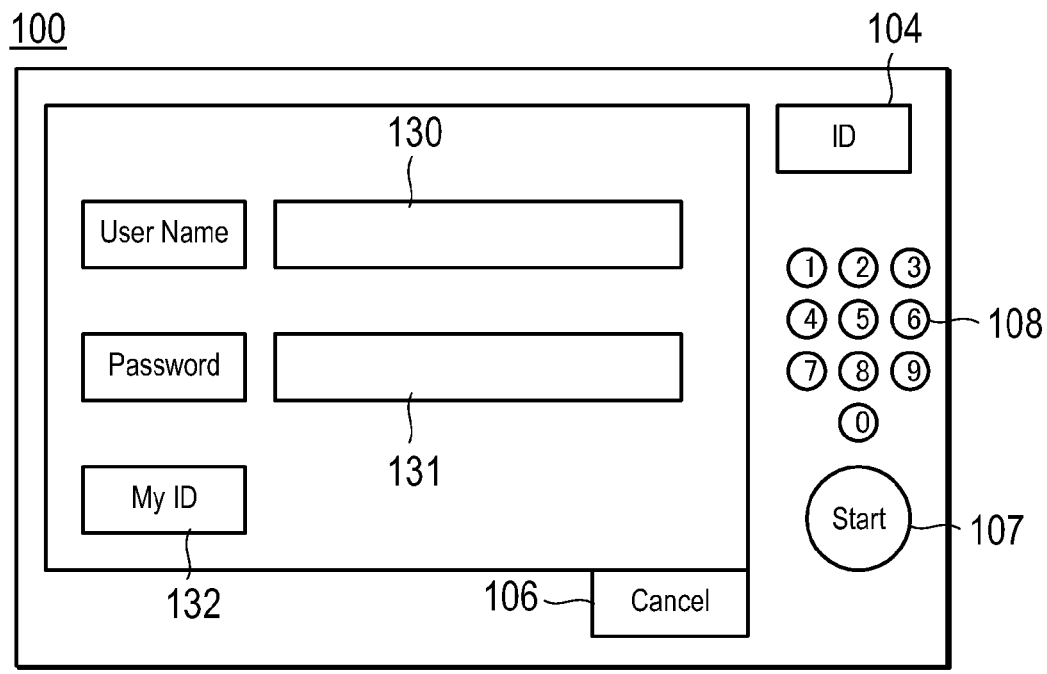
FIG. 18 is an illustrative diagram illustrating an exemplary user interface for the case of logging into the image forming apparatus by user authentication, which continues from FIG. 17.

When the user carrying such a terminal apparatus 200 touches the ID key 104, body area network communication is established. Thus, as shown in FIG. 18, a "my ID" key 132 for inputting his/her ID (an operation key for allowing information stored in the terminal apparatus 200 to be obtained) is simultaneously and additionally displayed on an ID input screen for general users (S6 and S301). The "my ID" key 132 is an operation key for obtaining user authentication information stored in the terminal apparatus 200.

Figure 19:
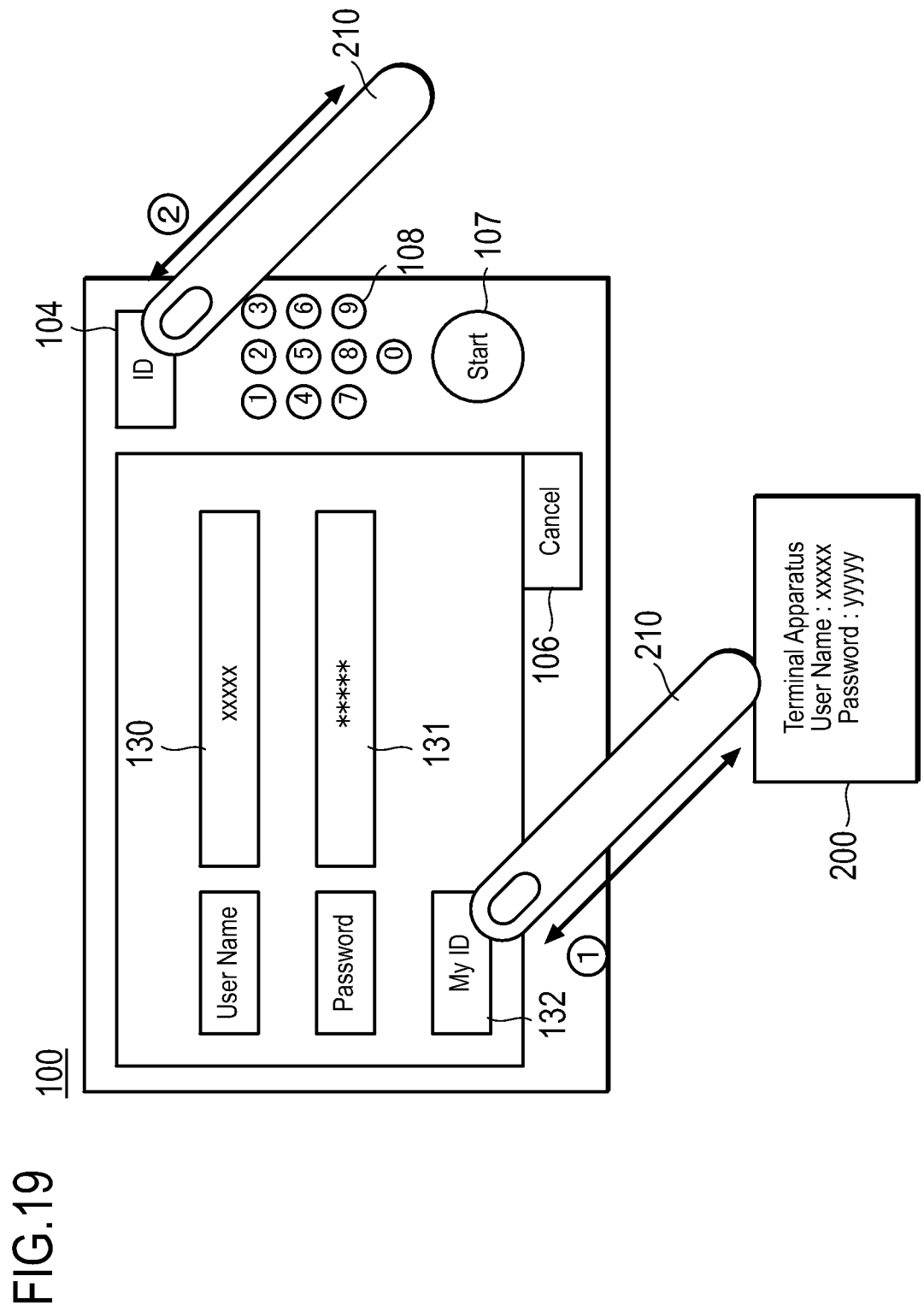
FIG. 19 is an illustrative diagram illustrating an exemplary user interface for the case of logging into the image forming apparatus by user authentication, which continues from FIG. 18.

As shown in FIG. 19, when the user first selects the "my ID" key 132 (circled 1 in FIG. 19), the control part 2 performs body area network communication with the terminal apparatus 200 again through the body area network communication part 5 to obtain his/her user name and password stored in the terminal apparatus 200. The character strings of the obtained user name and password are transferred from the terminal apparatus 200 to the image forming apparatus 1 and are inputted to the user name field 130 and the password field 131. To log in with this input information, the user touches the ID key 104 again (circled 2 in FIG. 19), by which authentication is performed for login.

By this, the user can easily input his/her user name and password without inputting character strings one character by one character.

As such, when login to the image forming apparatus 1 by user authentication is selected, too, in the present embodiment, after communication is established with the terminal apparatus 200, as shown in FIG. 18, the key 132 for selecting "my ID" is displayed, which avoids a situation where information stored in the carried terminal apparatus 200 is read simultaneously with the establishment of communication. In addition, there is no need to perform another operation for preventing the information from flowing by body area network communication (e.g., an operation to terminate body area network communication).

Figure 20:
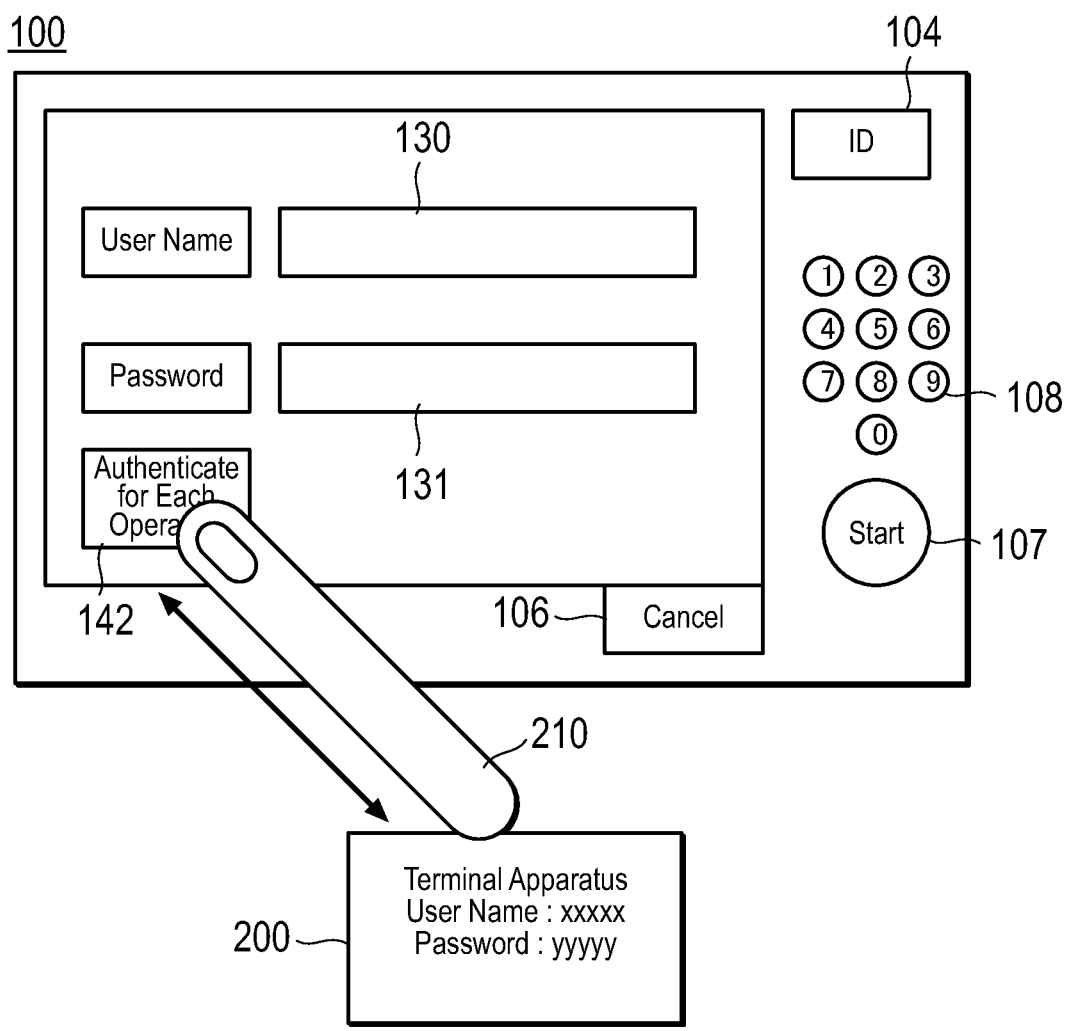
FIG. 20 is an illustrative diagram illustrating another exemplary user interface for the case of logging into the image forming apparatus by user authentication.

FIG. 20 is an illustrative diagram illustrating another exemplary user interface for the case of logging into the image forming apparatus 1 by user authentication.

In this example, too, as in FIG. 16, first, a user touches an ID key 104 on a function selection screen 100 which is an initial screen, by which the control part 2 checks whether body area network communication is established with a terminal apparatus 200 carried by the user through the body area network communication part 5 (S2 to S4).

If the user does not carry the terminal apparatus 200, then body area network communication is not established. Thus, in that case, as in FIG. 17, an ID input screen is displayed (S5 and S201 to S203). Here, the user inputs the character strings of a user name and a password one character by one character, using a character string input screen (not shown).

On the other hand, if the user carries the terminal apparatus 200, then body area network communication is established. Thus, as shown in FIG. 20, an "authenticate for each operation" key 142 for designating authentication for each operation (an operation key for allowing information stored in the terminal apparatus 200 to be obtained) is also simultaneously displayed (S6 and S311). By the user selecting the "authenticate for each operation" key 142, the control part 2 performs body area network communication with the terminal apparatus 200 again through the body area network communication part 5 to obtain his/her user name and password stored in the terminal apparatus 200, and at the same time, performs user authentication by the obtained user name and password.

By this, the user can easily input his/her user name and password without inputting character strings one character by one character, and at the same time, user authentication is performed each time a key operation is performed after such an input.

In this example, too, as shown in FIG. 20, the "authenticate for each operation" key 142 is displayed, which avoids a situation where information stored in the carried terminal apparatus 200 is read simultaneously with the establishment of communication. In addition, there is no need to perform another operation for preventing the information from flowing by body area network communication (e.g., an operation to terminate body area network communication).

FIGS. 21, 22, 23, and 24 are illustrative diagrams illustrating exemplary user interfaces for the case of accessing a security document box to print a security document.

Figure 21:
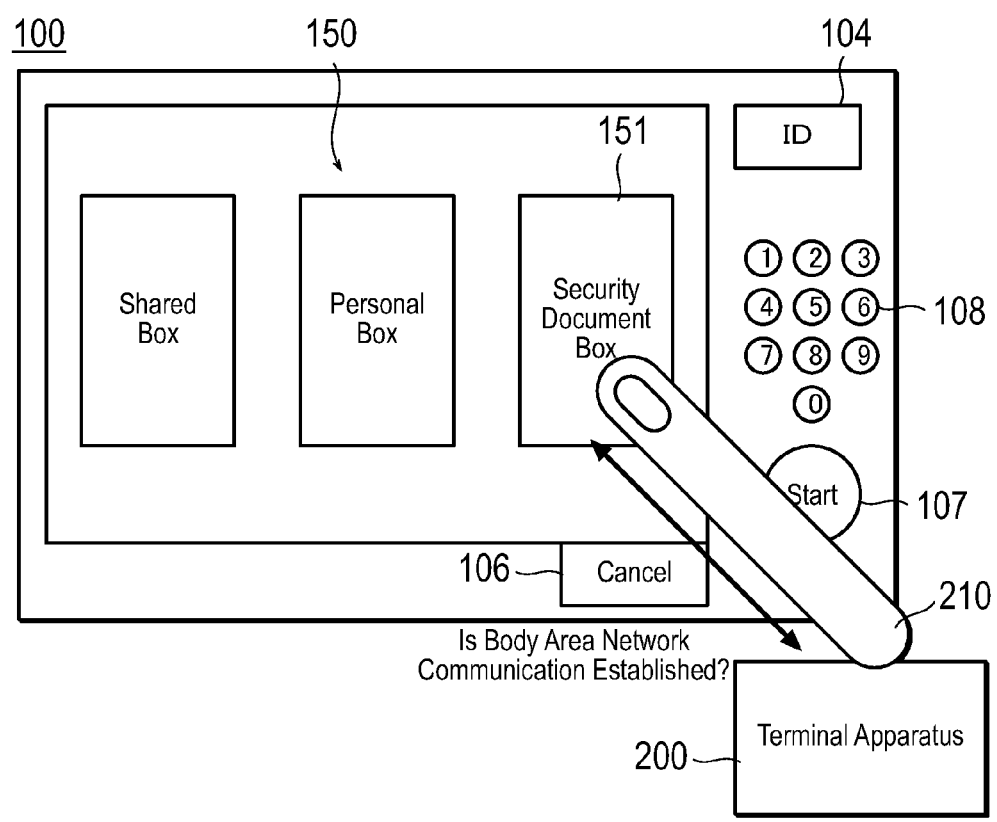
FIG. 21 is an illustrative diagram illustrating an exemplary user interface for the case of accessing a security document box to print a security document.

First, when a user touches a BOX key 105 (see FIG. 8) on a function selection screen 100 which is an initial screen, as shown in FIG. 21, the screen changes to one for selecting various document boxes. The document box selection screen illustrated in FIG. 21 displays box selection keys 150 (a shared box, a personal box, etc.) for selecting various document boxes and a security document box key 151 indicating a box that requires authentication.

Here, when the user touches the security document box key 151 to transition to a screen for inputting a document ID, the control part 2 checks whether body area network communication is established with a terminal apparatus 200 carried by the user through the body area network communication part 5 (S2 to S4).

Figure 22:
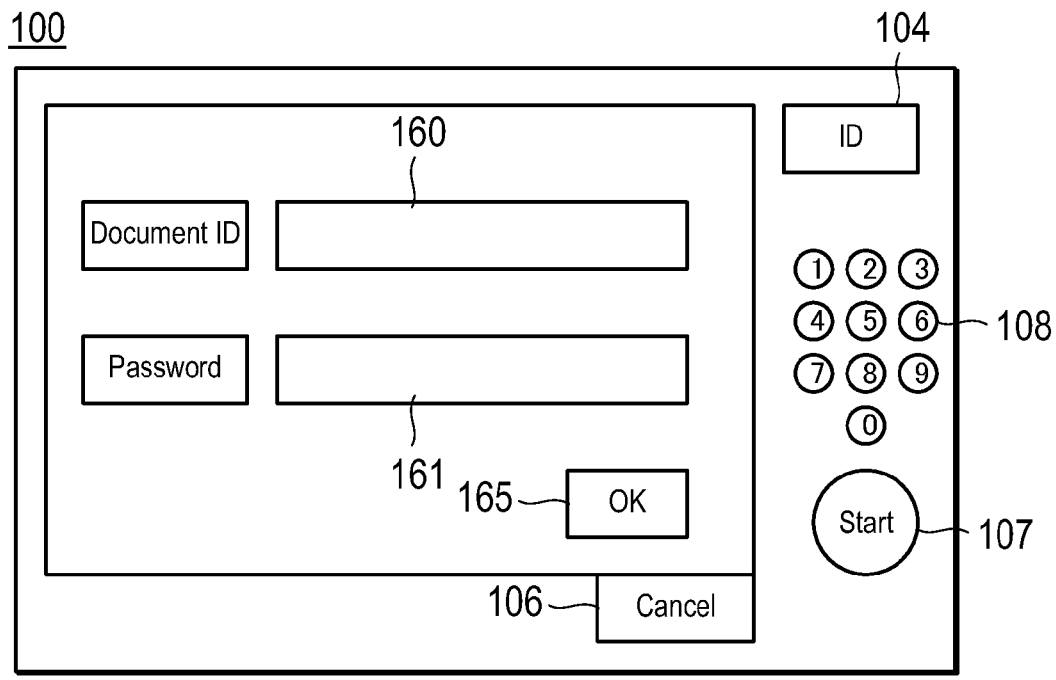
FIG. 22 is an illustrative diagram illustrating an exemplary user interface for the case of accessing a security document box to print a security document, which continues from FIG. 21.

If the user does not carry the terminal apparatus 200, then body area network communication is not established. Thus, in that case, as shown in FIG. 22, a document ID input screen for general users is displayed (S5 and S201 to S203). The document ID input screen for general users illustrated in FIG. 22 displays a document ID field 160, a password field 161, and an OK key 165. The user inputs the character strings of a document ID and a password one character by one character, using a character string input screen (not shown).

On the other hand, the user carrying the terminal apparatus 200 storing information about a security document is thinking that he/she wants to access a security document box to print a security document which is saved in the security document box and is registered by him/herself.

Figure 23:
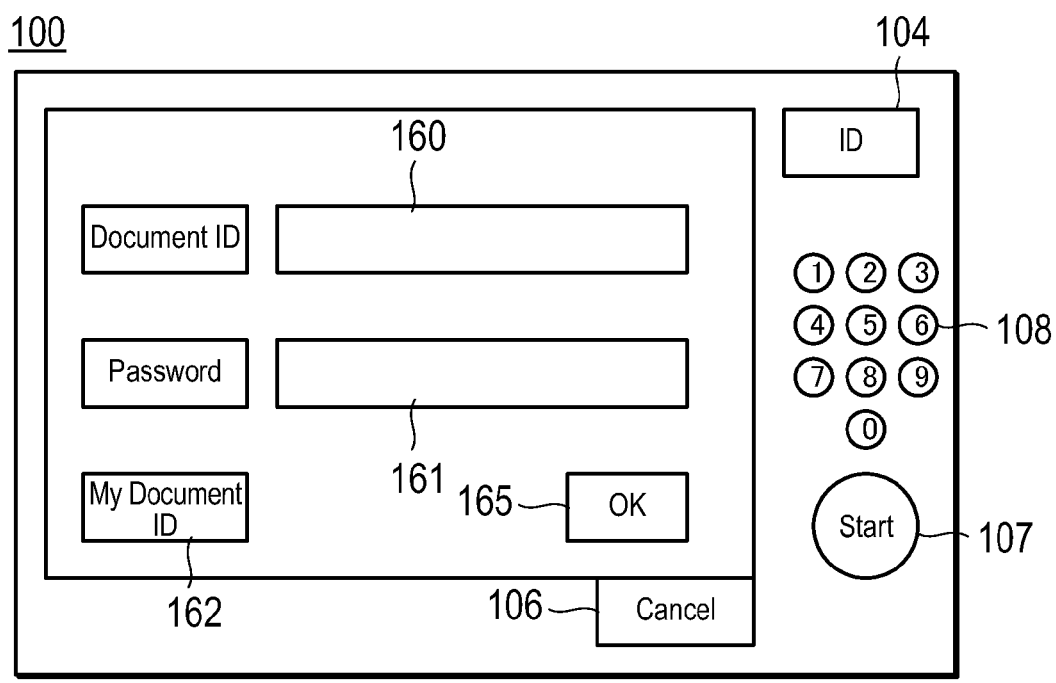
FIG. 23 is an illustrative diagram illustrating an exemplary user interface for the case of accessing a security document box to print a security document, which continues from FIG. 22.

Hence, when the user carrying such a terminal apparatus 200 touches the security document box key 151, body area network communication is established. Thus, as shown in FIG. 23, a "my document ID" key 162 for inputting his/her document ID (an operation key for allowing information stored in the terminal apparatus 200 to be obtained) is simultaneously and additionally displayed on a document ID input screen for general users (S6, S107, and S108). The "my document ID" key 162 is a key for obtaining security document information stored in the terminal apparatus 200.

Figure 24:
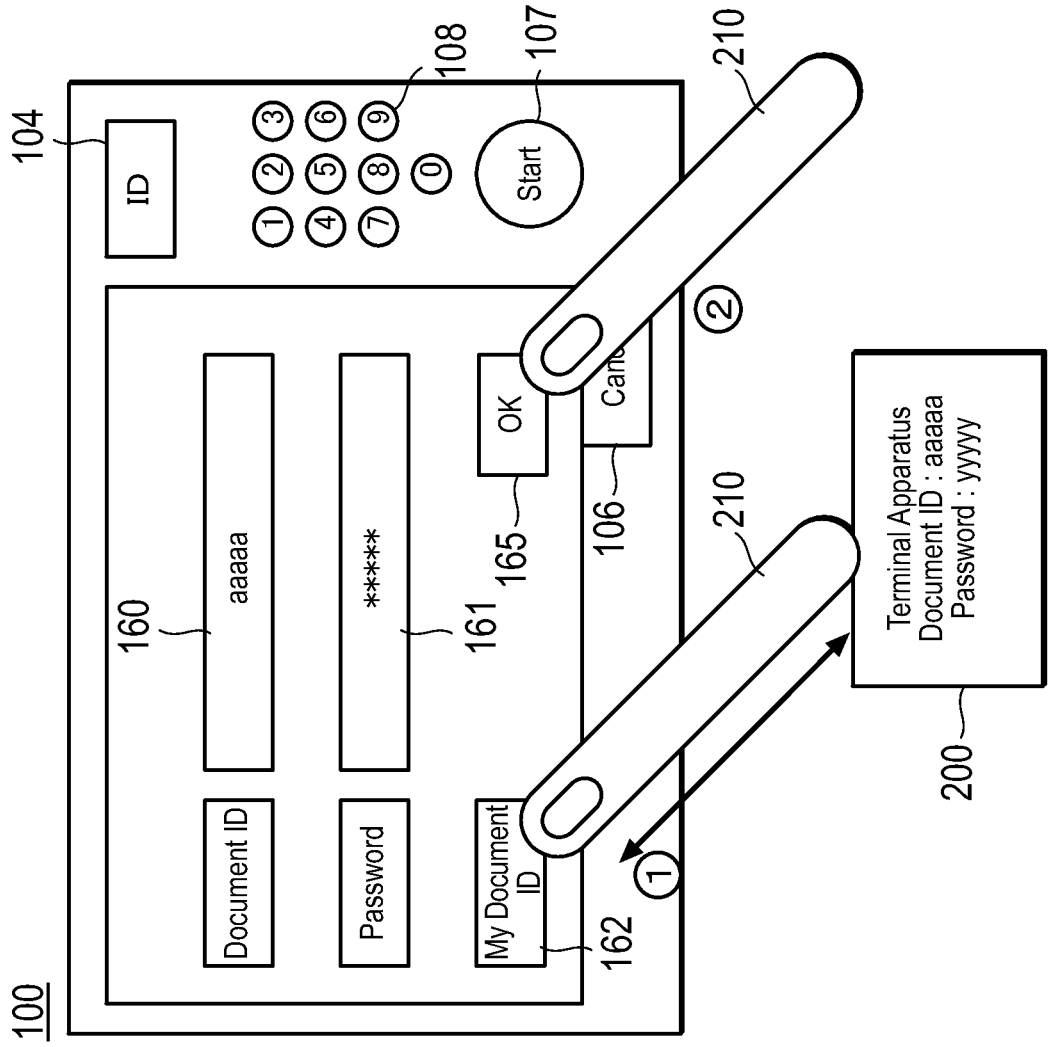
FIG. 24 is an illustrative diagram illustrating an exemplary user interface for the case of accessing a security document box to print a security document, which continues from FIG. 23.

As illustrated in FIG. 24, when the user selects the "my document ID" key 162 (circled 1 in FIG. 24), the control part 2 performs body area network communication with the terminal apparatus 200 again through the body area network communication part 5 to obtain his/her document ID and password stored in the terminal apparatus 200. The document ID and password are transferred from the terminal apparatus 200 to the image forming apparatus 1 and are inputted to the document ID field 160 and the password field 161. To identify a document with this input information, the user touches the OK key 165 (circled 2 in FIG. 24), by which document authentication is performed. Thereafter, by pressing a start key 107, the document is print-outputted in front of the user.

By this, the user can easily input his/her document ID and password without inputting character strings one character by one character.

As such, when the box function for security documents is selected, too, in the present embodiment, after communication is established with the terminal apparatus 200, as shown in FIG. 23, the "my document ID" key 162 is displayed, which avoids a situation where information stored in the carried terminal apparatus 200 is read simultaneously with the establishment of communication. In addition, there is no need to perform another operation for preventing the information from flowing by body area network communication (e.g., an operation to terminate body area network communication).

According to the present embodiment described above, advantageous effects such as those described below are provided.

In the present embodiment, first, it is determined whether communication with a terminal apparatus 200 has been established. Even if the communication has been established at that time, information from the terminal apparatus 200 carried by a user is not obtained at that stage. Then, to move to the next operation, an operation key for allowing information stored in the terminal apparatus 200 to be obtained is displayed, and an input from the user is waited. Hence, a situation where information stored in the terminal apparatus 200 carried by the user is read simultaneously with the establishment of communication is avoided, and there is no need to perform another operation for preventing the information from flowing by body area network communication (e.g., an operation to terminate body area network communication). In addition, by this, both of a user carrying the terminal apparatus 200 and a user who wants to perform other functions or operation than operation related to the terminal apparatus 200 can easily move to those functions and operation. Of course, for the user carrying the terminal apparatus 200 capable of performing communication by body area network communication, information stored in the terminal apparatus 200 is obtained only by the user selecting an operation key, and subsequent operation is automatically performed.

Therefore, a demand for automation by a holder (user) of a terminal apparatus using body area network communication can be met, and manual operations can be performed according to user's moment-to-moment needs with minimum work.

In addition, at the stage of the establishment of communication, it is not checked whether the user carrying the terminal apparatus 200 is a user who can be authenticated. Therefore, no influence is exerted on operations performed by a general user not carrying the terminal apparatus 200, and operation unique to a user carrying the terminal apparatus 200 can be easily performed.

In addition, display of an operation key for allowing information stored in a terminal apparatus to be obtained is deleted when a predetermined period of time has elapsed. In addition, my key is deleted when a user not carrying a terminal apparatus performs an operation. This can minimize a situation where when a general user touches such an operation key, he/she is perplexed because no operation occurs.

Note that although whether body area network communication can be performed is determined by touching various function keys or operation keys, such a determination as to whether body area network communication can be performed may be made by the user touching areas other than key displayed regions (a message area, a background area, etc.).

In addition, although there are illustrated some examples of operation keys for obtaining information from a terminal apparatus, the information is not limited thereto as long as the information can be stored in the terminal apparatus.

Furthermore, although an example of displaying one operation key on one screen is illustrated, a plurality of operation keys may be displayed.

In addition, although in the present embodiment a multifunction image forming apparatus having various functions (scanner, copy, facsimile, box, function setting login, etc.) is described as an example of an information processing apparatus, the present invention is not limited to such a multifunction image forming apparatus, and an information processing apparatus may have at least one function. For example, in the case of a machine that solely serves as a scanner, the machine does not need to have a print function. In the case of a machine that solely serves as a copier, the machine does not need to have an image reading part. In the case of a printer that does not have a scanner function but has a box function, the printer does not need to have an image reading part.

The present invention is construed by the claims. Needless to say, the present invention is not construed to be limited to the above-described embodiment or cases.

What is claimed is:

1. An information processing apparatus having plural functions comprising:
    a body area network communication part that performs communication with a terminal apparatus carried by a user, using a user's human body as a communication channel;
    a display and operating part having a display part that displays a screen and having, on said display part, an electrode for body area network communication, said screen receiving an operation performed by said user; and
    a control part which controls said body area network communication part and said display and operating part, wherein
    said control part makes said display part display a function selection screen for selecting any of said plural functions,
    said control part determines whether communication between said body area network communication part and said terminal apparatus is established when any of said plural functions is selected in said function selection screen by said user, and wherein
    when said control part determines that communication between said body area network communication part and said terminal apparatus is not established, said control part makes said display part display a first screen corresponding to the function that is selected in said function selection screen,
    while when said control part determines that communication between said body area network communication part and said terminal apparatus is established said control part makes said display part display a second screen which corresponds to said first screen, and to which is added an operation key for obtaining information, according to said selected function, by said body area network communication from information stored in said terminal apparatus.

2. The information processing apparatus as claimed in claim 1, wherein said control part obtains information stored in said terminal apparatus through said body area network communication part after an input is made to said operation key displayed on said display and operating part.

3. The information processing apparatus as claimed in claim 1, wherein said control part displays said operation key for a predetermined period of time after determining that communication between said body area network communication part and said terminal apparatus is established.

4. The information processing apparatus as claimed in claim 1, wherein in a case in which it is determined that communication between said body area network communication part and said terminal apparatus cannot be established, when said operation key is being displayed, said control part deletes from the display said operation key being displayed.

5. The information processing apparatus as claimed in claim 1, wherein said function selection screen is an initially displayed screen.

6. The information processing apparatus as claimed in claim 1, wherein said plural functions include a scanner function, and
wherein, when said scanner function is selected in said function selection screen and said control part determines that communication between said body area network communication part and said terminal apparatus is established, then said control part makes said display part display the second screen which corresponds to said first screen corresponding to said scanner function to which is added as said operation key a key for obtaining destination information stored in said terminal apparatus.

7. The information processing apparatus as claimed in claim 1, wherein said plural functions include a copy function, and
wherein, when said copy function is selected in said function selection screen and said control part determines that communication between said body area network communication part and said terminal apparatus is established, then said control part makes said display part display the second screen which corresponds to said first screen corresponding to said copy function to which is added as said operation key a key for obtaining personal setting information stored in said terminal apparatus.

8. The information processing apparatus as claimed in claim 1, wherein said plural functions include a user authentication function, and
wherein, when said user authentication function is selected in said function selection screen and said control part determines that communication between said body area network communication part and said terminal apparatus is established, then said control part makes said display part display the second screen which corresponds to said first screen corresponding to said user authentication function to which is added as said operation key a key for obtaining user authentication information stored in said terminal apparatus.

9. The information processing apparatus as claimed in claim 1, wherein said plural functions include a security document printing function, and
wherein, when said security document printing function is selected in said function selection screen and said control part determines that communication between said body area network communication part and said terminal apparatus is established, then said control part makes said display part display the second screen which corresponds to said first screen corresponding to said security document printing function to which is added as said operation key a key for obtaining security document information stored in said terminal apparatus.

10. A control method for an information processing apparatus having plural functions including:
a body area network communication part that performs communication with a terminal apparatus carried by a user, using a user's human body as a communication channel;
a display and operating part having a display part that displays a screen and having an electrode for body area network communication disposed on said display part, said screen receiving an operation performed by said user; and
a control part which controls said body area network communication part and said display and operating part, wherein
said control part makes said display part display a function selection screen for selecting any of said plural functions,
said control part determines whether communication between said body area network communication part and said terminal apparatus is established, when any of said plural functions is selected in said function selection screen by said user, and
when said control part determines that communication between said body area network communication part and said terminal apparatus is not established, said control part makes said display part display a first screen corresponding to the function that is selected in said function selection screen,
while when said control part determines that communication between said body area network communication part and said terminal apparatus is established said control part makes said display part display a second screen which corresponds to said first screen, and to which is added an operation key for obtaining information, according to said selected function, by said body area network communication from information stored in said terminal apparatus.

11. The control method for an information processing apparatus as claimed in claim 10, wherein said control part obtains information stored in said terminal apparatus through said body area network communication part after said operation key is displayed followed by an input being made from said operation key displayed on said display part.

12. The control method for an information processing apparatus as claimed in claim 10, wherein said operation key is at least any one of a key for obtaining destination information stored in said terminal apparatus, a key for obtaining personal setting information stored in said terminal apparatus, a key for obtaining user authentication information stored in said terminal apparatus, and a key for obtaining security document information stored in said terminal apparatus.

13. The control method for an information processing apparatus as claimed in claim 10, wherein said control part displays said operation key for a predetermined period of time after determining that communication between said body area network communication part and said terminal apparatus is established.

14. The control method for an information processing apparatus as claimed in claim 10, wherein in a case in which it is determined that communication between said body area network communication part and said terminal apparatus cannot be established, when said operation key is being displayed, said control part deletes said operation key being displayed.

15. The control method as claimed in claim 10, wherein said function selection screen is an initially displayed screen.

16. The control method as claimed in claim 10, wherein said plural functions include a scanner function, and wherein, when said scanner function is selected in said function selection screen and said control part determines that communication between said body area network communication part and said terminal apparatus is established, then said control part makes said display part display the second screen which corresponds to said first screen corresponding to said scanner function to which is added as said operation key a key for obtaining destination information stored in said terminal apparatus.

17. The control method as claimed in claim 10, wherein said plural functions include a copy function, and wherein, when said copy function is selected in said function selection screen and said control part determines that communication between said body area network communication part and said terminal apparatus is established, then said control part makes said display part display the second screen which corresponds to said first screen corresponding to said copy function to which is added as said operation key a key for obtaining personal setting information stored in said terminal apparatus.

18. The control method as claimed in claim 10, wherein said plural functions include a user authentication function, and wherein, when said user authentication function is selected in said function selection screen and said control part determines that communication between said body area network communication part and said terminal apparatus is established, then said control part makes said display part display the second screen which corresponds to said first screen corresponding to said user authentication function to which is added as said operation key a key for obtaining user authentication information stored in said terminal apparatus.

19. The control method as claimed in claim 10, wherein said plural functions include a security document printing function, and wherein, when said security document printing function is selected in said function selection screen and said control part determines that communication between said body area network communication part and said terminal apparatus is established, then said control part makes said display part display the second screen which corresponds to said first screen corresponding to said security document printing function to which is added as said operation key a key for obtaining security document information stored in said terminal apparatus.

20. A non-transitory computer readable storage medium stored with a program to cause a computer to control an information processing apparatus which comprises a body area network communication part that performs communication with a terminal apparatus carried by a user, using a user's human body as a communication channel; and a display and operating part having a display part that displays a screen and having an electrode for body area network communication disposed on said display part, said screen receiving an operation performed by said user; and a control part which controls said body area network communication part and said display and operating part, said program causing the computer to execute a process comprising:

a step (a) of determining at a time of said user touching said electrode whether communication between said body area network communication part and said terminal apparatus can be established; and a step (b) of displaying on said display part an operation key for obtaining information stored in said terminal apparatus by using said body area network communication, when it is determined at said step (a) that communication between said body area network communication part and said terminal apparatus can be established; and said control part makes said display part display a function selection screen for selecting any of said plural functions, said control part determines whether communication between said body area network communication part and said terminal apparatus is established in response to selection by said user in said function selection screen of any of said plural functions, and when said control part determines that communication between said body area network communication part and said terminal apparatus is not established, said control part makes said display part display a first screen corresponding to the function that is selected in said function selection screen, while when said control part determines that communication between said body area network communication part and said terminal apparatus is established said control part makes said display part display a second screen which corresponds to said first screen, and to which is added an operation key for obtaining information, according to said selected function, by said body area network communication from information stored in said terminal apparatus.

21. The non-transitory computer readable storage medium claimed in claim 20, said program further causing the computer to execute:

a step (c) of obtaining information stored in said terminal apparatus through said body area network communication part in response to said step (b) being performed followed by an input being made from said operation key displayed on said display part.

22. The non-transitory computer readable storage medium as claimed in claim 20, wherein said operation key is at least any one of a key for obtaining destination information stored in said terminal apparatus, a key for obtaining personal setting information stored in said terminal apparatus, a key for obtaining user authentication information stored in said terminal apparatus, and a key for obtaining security document information stored in said terminal apparatus.

23. The non-transitory computer readable storage medium as claimed in claim 20, wherein said operation key displayed in said step (b) is displayed for a predetermined period of time after determining in said step (a) that communication between said body area network communication part and said terminal apparatus can be established.

24. The non-transitory computer readable storage medium claimed in claim 20, said program further causes the computer to execute:

a step (d) of deleting, when said operation key is being displayed, said operation key being displayed in a case in which it is determined in said step (a) that communication between said body area network communication part and said terminal apparatus cannot be established.

25. The information processing apparatus as claimed in claim 20, wherein said function selection screen is an initially displayed screen.

26. The non-transitory computer readable storage medium as claimed in claim 20, wherein said plural functions include a scanner function, and wherein, when said scanner function is selected in said function selection screen and said control part determines that communication between said body area network communication part and said terminal apparatus is established, then said control part makes said display part display the second screen which corresponds to said first screen corresponding to said scanner function to which is added as said operation key a key for obtaining destination information stored in said terminal apparatus.

27. The non-transitory computer readable storage medium as claimed in claim 20, wherein said plural functions include a copy function, and wherein, when said copy function is selected in said function selection screen and said control part determines that communication between said body area network communication part and said terminal apparatus is established, then said control part makes said display part display the second screen which corresponds to said first screen corresponding to said copy function to which is added as said operation key a key for obtaining personal setting information stored in said terminal apparatus is added as said operation key.

28. The non-transitory computer readable storage medium as claimed in claim 20, wherein said plural functions include a user authentication function, and wherein, when said user authentication function is selected in said function selection screen and said control part determines that communication between said body area network communication part and said terminal apparatus is established, then said control part makes said display part display the second screen which corresponds to said first screen corresponding to said user authentication function to which is added as said operation key a key for obtaining user authentication information stored in said terminal apparatus is added as said operation key.

29. The non-transitory computer readable storage medium as claimed in claim 20, wherein said plural functions include a security document printing function, and wherein, when said security document printing function is selected in said function selection screen and said control part determines that communication between said body area network communication part and said terminal apparatus is established, then said control part makes said display part display the second screen which corresponds to said first screen corresponding to said security document printing function to which is added as said operation key a key for obtaining security document information stored in said terminal apparatus is added as said operation key.

* * * * *